United States Patent [19]

Yamada et al.

[11] Patent Number: 5,458,804
[45] Date of Patent: Oct. 17, 1995

[54] LIQUID CRYSTAL COMPOSITION, LIQUID CRYSTAL DEVICE AND LIQUID CRYSTAL APPARATUS

[75] Inventors: Syuji Yamada, Atsugi; Akio Yoshida, Hiratsuka; Kenji Shinjo; Masahiro Terada, both of Atsugi; Hiroshi Mizuno, Zama, all of Japan

[73] Assignee: Canon Kabushiki Kaisha, Tokyo, Japan

[21] Appl. No.: 65,917

[22] Filed: May 25, 1993

[30] Foreign Application Priority Data

May 26, 1992 [JP] Japan .................... 4-133698

[51] Int. Cl.$^6$ .......................... C09K 19/52; C09K 19/32; G02F 1/133
[52] U.S. Cl. .................... 252/299.01; 252/299.62; 359/103; 359/104
[58] Field of Search .................... 252/299.01, 299.61, 252/299.62; 359/103, 100, 104

[56] References Cited

U.S. PATENT DOCUMENTS

| | | | |
|---|---|---|---|
| 4,367,924 | 1/1983 | Clark et al. | 350/334 |
| 5,034,151 | 7/1991 | Shinjo et al. | 252/299.61 |
| 5,116,530 | 5/1992 | Togano et al. | 252/299.61 |
| 5,186,858 | 2/1993 | Terada et al. | 252/299.61 |
| 5,305,131 | 4/1994 | Terada et al. | 252/299.61 |

FOREIGN PATENT DOCUMENTS

| | | |
|---|---|---|
| 0444705 | 9/1991 | European Pat. Off. . |
| 0509490 | 10/1992 | European Pat. Off. . |
| 0539991 | 5/1993 | European Pat. Off. . |
| 0546338 | 6/1993 | European Pat. Off. . |
| 0548548 | 6/1993 | European Pat. Off. . |
| 107216 | 8/1981 | Japan . |
| 31120 | 2/1985 | Japan . |
| 60-069055 | 4/1985 | Japan . |
| 140198 | 6/1989 | Japan . |
| 252624 | 11/1991 | Japan . |

OTHER PUBLICATIONS

Yamada et al., Jap. J. App. Phys., vol. 29, No. 9 (Sep. 1990) 1757:64.
SID Intl. Symposium, Digest of Tech. Papers (May, 1985) First Ed. 373:76.
Ouchi et al., Jap. J. App. Phys., vol. 27, No. 5 (1988) 725:8.
Rieker et al., Phys. Rev. Lett., vol. 59, No. 23 (1987) 2658:61.
Nakano et al., Jap. J. App. Phys., vol. 19, No. 10 (1980) 2013:4.

*Primary Examiner*—Shean Wu
*Attorney, Agent, or Firm*—Fitzpatrick, Cella, Harper & Scinto

[57] ABSTRACT

A liquid crystal (composition) containing a ferroelectric liquid crystal shows a layer inclination angle δ in smectic phase providing a specific temperature dependence. The inclination angle δ increases on temperature decrease down to a mediate temperature and decreases on temperature decrease below the mediate temperature. The inclination angle δ keeps a positive value in an ambient temperature or starts to increase again on further temperature decrease before it reaches zero degrees. The liquid crystal (composition) is usable for providing a liquid crystal device or apparatus with decreased temperature dependences of driving conditions and improved low-temperature storage properties.

48 Claims, 7 Drawing Sheets

C1 ALIGNMENT $H + \delta > \alpha$

C2 ALIGNMENT $H - \delta > \alpha$

LIQUID CRYSTAL COMPOSITION, LIQUID CRYSTAL DEVICE AND LIQUID CRYSTAL APPARATUS

FIELD OF THE INVENTION AND RELATED ART

The present invention relates to a liquid crystal composition, and a liquid crystal device and a liquid crystal apparatus using the composition. More particularly, the present invention relates to a novel liquid crystal composition improved in responsiveness to an electric field and low-temperature storage characteristics, a liquid crystal device using the composition suitable for use in a liquid crystal display apparatus, a liquid crystal-optical shutter, etc., and a liquid crystal apparatus using the liquid crystal device.

Heretofore, the use of liquid crystal devices having bistability has been proposed by Clark and Lagerwall (e.g. Japanese Laid-Open Patent Appln. (JP-A). 56-107216, U.S. Pat. No. 4367924, etc.). In this instance, as the liquid crystals having bistability, ferroelectric liquid crystals having chiral smectic C-phase (SmC*) or H-phase (SmH*) are generally used.

These liquid crystals have bistable states of first and second stable states with respect to an electric field applied thereto. For instance, the bistable liquid crystal molecules are oriented to first and second optically stable states with respect to one and the other electric field vectors, respectively. Further, this type of liquid crystal has a property (bistability) of assuming either one of the two stable states in response to an applied electric and retaining the resultant state in the absence of an electric field.

In addition to the above-described characteristic of showing bistability, the ferroelectric liquid crystal has an excellent property, i.e., a high-speed responsiveness. This is because the spontaneous polarization of the ferroelectric liquid crystal and an applied electric field directly interact with each other to induce transition of orientation states. The resultant response speed is faster than the response speed due to the interaction between dielectric anisotropy and an electric field by 3 to 4 digits.

Further, in a liquid crystal device utilizing birefringence of a liquid crystal, the transmittance under right angle cross nicols is given by the following equation:

$$I/I_O = \sin^2 4\theta a \sin^2(\Delta nd/\lambda)\pi,$$

wherein $I_O$: incident light intensity,

I: transmitted light intensity,

θa: apparent tilt angle,

Δn: refractive index anisotropy, d: thickness of the liquid crystal layer,

λ: wavelength of the incident light.

The apparent tilt angle θa in a non-helical structure is recognized as a half of an angle between the average molecular axis directions of liquid crystal molecules in a twisted alignment in a first orientation state and a second orientation state. According to the above equation, it is shown that an apparent tilt angle θa of 22.5 degrees provides a maximum transmittance and the apparent tilt angle θa in a non-helical structure for realizing bistability should desirably be as close as possible to 22.5 degrees in order to provide a high transmittance and a high contrast.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, it has been found that an apparent tilt angle θa (a half of an angle formed between molecular axes at two stable states) in a ferroelectric liquid crystal with a non-helical structure obtained by alignment with the conventional polyimide film treated by rubbing has become smaller as compared with a a cone angle Ⓗ (the angle Ⓗ is a half of the apex angle of the cone as shown in FIG. 3A as described below) in the ferroelectric liquid crystal having a helical structure. Particularly, the apparent tilt angle θa in a ferroelectric liquid crystal with a non-helical structure obtained by alignment with the conventional polyimide film treated by rubbing was found to be generally on the order of 3–8 degrees, and the transmittance at that time was at most about 3 to 5%.

A smectic liquid crystal generally has a layer structure and, due to a shrinkage of spacing between layers when it causes a transition from smectic A phase (SmA) to smectic C phase (SmC) or chiral smectic C phase (SmC*), it assumes a chevron structure as shown in FIG. 2 where the layers 21 are bent at a mid point between a pair of substrates 20a and 20b.

There are two alignment states depending on the bending directions as shown in FIG. 2, including a C1 alignment state 22 appearing immediately after transition from a higher temperature phase to SmC* phase and a C2 alignment state 23 which appears in mixture with the C2 alignment state on further cooling. We have further discovered (1) that the above C1→C2 transition does not readily occur when a specific combination of an alignment film providing a high pretilt angle a and a liquid crystal is used, and the C2 alignment state does not occur at all when a specific liquid crystal is used, and (2) that, in C1 alignment state, two stable states providing a high contrast (hereinafter inclusively called "uniform state") are formed in addition to hitherto-found two stable states providing low contrast (hereinafter inclusively called "splay state") wherein liquid crystal directors are twisted between the substrates.

These states can be transformed from one to the other by applying a certain electric field. More specifically, transition between two splay states is caused under application of weak positive and negative pulse electric fields, and transition between two uniform states is caused under application of strong positive and negative pulse electric fields. By using the two uniform states, it is possible to realize a display device which is brighter and shows a higher contrast than the conventional devices. Accordingly, it is expected that a display with a higher quality can be realized by using a display device wherein the entire display area is formed in C1 alignment state and the high contrast two states in the C1 alignment state are used as two states representing white and black display states.

In order to realize C1 alignment state without yielding C2 alignment state as described above, the following conditions are required.

Referring to FIGS. 3A and 3B, directions in the vicinity of the substrates in the C1 alignment and C2 alignment are disposed on cones 31 shown in FIGS. 3A and 3B, respectively. As is well known, as a result of rubbing, liquid crystal molecules contacting a substrate surface form a pretilt angle α (i.e., an angle formed by a substrate 20 and liquid crystal molecules 33), the direction of which is such that the liquid crystal molecules 33 raise a forward end up (i.e., spaced from the substrate surface) in the direction of the rubbing indicated by an arrow A (as shown also in FIG. 2). From the above, it is required that the following relationships are satisfied among a cone angle Ⓗ, the pretilt angle α and a layer inclination angle δ (i.e., an angle formed by a normal 32 to the substrate 20 and liquid crystal molecular layers 21):

Ⓗ+δ>α in C1 alignment, and

Ⓗ−δ>α in C2 alignment.

Accordingly, the condition for preventing the formation of C2 alignment but allowing C1 alignment is Ⓗ−δ<α, that is Ⓗ<α+δ+tm (i).

Further, from simple consideration of a torque acting on a liquid crystal molecule at a boundary surface in switching from one position to the other position under an electric field, the relationship of a α<δ(ii) is given as a condition for easy switching of such a liquid crystal molecule at the boundary.

Accordingly, in order to form the C1 alignment more stably, it is effective to satisfy the condition (ii) in addition to the condition (i).

From further experiments under the conditions of (i) and (ii), the apparent tilt angle θa is increased from 3–8 degrees obtained when the conditions (i) and (ii) are not satisfied to 8–16 degrees when the conditions (i) and (ii) are satisfied according to the present invention, and also an empirical relationship of Ⓗ>ηa >Ⓗ/2. (iii) has been also found.

As described above, it has been clarified that the satisfaction of the conditions (i), (ii) and (iii) provides a display device capable of displaying a high-contrast image (JP-A 3-252624).

In order to stably form the C1 alignment state and also provide a good alignment characteristic, it is also very effective to perform cross-rubbing, that is, rubbing a pair of substrates in directions intersecting at an angle of 2–25 degrees.

Incidentally, a display apparatus using a chiral smectic liquid crystal can realize a large screen and a high resolution which by far exceed those attained by conventional CRT and TN-type liquid crystal displays. However, as the screen size and resolution are increased, the frame frequency (frequency constituting one picture) becomes low. This leads to a problem that the picture-rewriting speed becomes slow and the motion picture display becomes slow, e.g., in cases of smooth scrolling and cursor movement on a graphic screen. A solution to this problem has been given in, e.g., JP-A 60-31120 and JP-A 1-140198.

More specifically, there has been disclosed a display apparatus including a display panel comprising scanning electrodes and data electrodes arranged in a matrix, whole-area writing means for selecting all or a prescribed part of the scanning electrodes for writing and partial writing means for selecting a part of the above-mentioned all or a prescribed part of the scanning electrodes. As a result, a partial motion picture display can be performed at a high speed by the partial writing mode, and the partial writing and the whole-area writing can be performed compatibly.

As described above, it has become clear that it is possible to realize a large-area and high-resolution display which can display high-contrast images at a high speed by incorporating a liquid crystal device satisfying the conditions (i), (ii) and (iii) in the above-described display apparatus capable of performing the partial writing.

Thus, a ferroelectric liquid crystal potentially has very excellent characteristics, and by making use of these properties, it is possible to provide essential improvements to many of the above-mentioned problems with the conventional TN-type devices. Particularly, the application to a high-speed optical shutter and a display of a high density and a large picture is expected. For this reason, there has been made extensive research with respect to liquid crystal materials showing ferroelectricity. However, ferroelectric liquid crystal materials developed heretofore cannot be said to satisfy sufficient characteristics required for a liquid crystal device including low-temperature storage properties, high-speed responsiveness, etc.

In fact, when a liquid crystal device comprising a ferroelectric liquid crystal is used at a temperature range of 5°–35° C., a temperature of the liquid crystal device per se becomes about 5°–50° C. In this case, the ferroelectric liquid crystal generally used shows a considerably large change in response speed with respect to temperature since the change in response speed largely depends upon a viscosity of the ferroelectric liquid crystal used. Thus, in the temperature range 5°–50° C., the response speed changes by a factor of about 10–15, so that such a change exceeds range of control by, e.g., a driving voltage at this stage.

Further, in case where a display apparatus with a large display area is put into a practical use, the display apparatus is required to effect display under certain driving conditions (such as a certain applied voltage and a certain response speed) against a temperature distribution of several to ten and several °C. over the display area. The conventional liquid crystal materials for use in a display apparatus have failed to meet the requirement since a temperature-dependence of the driving conditions is large.

According to study of our research group, it has been found that two similar liquid crystal compositions containing compounds which are identical to each other except for a light difference in their chain length, can show substantially different temperature-dependences (especially at a lower temperature side) of response speed even when their viscosities and spontaneous polarizations are not substantially different. It has been also found that the above phenomenon is attributable to the difference in temperature-dependence of layer inclination angle δ in a temperature range where the temperature-dependence changes.

This is because that a larger layer inclination angle δ provides a smaller net component in the direction of a normal to the substrates of the spontaneous polarization director and therefore results in a decrease in interaction with an external electric field. If a liquid crystal composition shows a layer inclination angle δ which decreases with temperature decrease on a low temperature side where the temperature-dependence of response speed tend to be intense, the liquid crystal composition can provide remarkable improvements in temperature-dependence of response speed at low temperatures compared with a conventional liquid crystal composition showing a monotonous increase in inclination angle with temperature decrease.

Our research group has disclosed in U.S. Pat. No. 5,305,131 that a value and a temperature dependence of a layer inclination angle δ of a liquid crystal (composition) are controlled or regulated by factors of liquid crystal compounds contained therein, such as a skeleton structure, side chain lengths and an affinity of combination. In many cases, a type of a liquid crystal compound tending to provide a broader smectic A temperature range changes the temperature dependence of δ. More specifically, when "layer inclination angle δ" is defined as an angle formed by a smectic layer (line) of a ferroelectric liquid crystal having chevron structure and a normal to a substrate, it is possible to provide a liquid crystal device and a display apparatus with a decreased temperature dependence of driving conditions by employing a liquid crystal composition showing ferroelericity characterized by having a temperature dependence of the layer inclination angle δ which increases on temperature decrease down to a mediate temperature (i.e., a maximum) and decrease on further temperature decrease below the mediate temperature.

According to our further study, however, we have encountered the following new problem. When a liquid crystal device using a liquid crystal composition having a temperature dependence of δ as described above is further cooled to a temperature (on a lower temperature side of SmC* phase) below an operation (or service) temperature range as a display device, the value of δ becomes zero degrees, i.e., a layer structure in smectic phase is changed from a chevron structure to a bookshelf structure in some cases. Herein, a temperature at this time is referred to as "TδS".

In such a liquid crystal composition used in the liquid crystal device, various properties such as a layer inclination angle δ, an apparent tilt angle θa (defined as a half of an angle between first and second extinct positions), a contrast ratio C/R, and an alignment state of liquid crystal molecules are changed when the liquid crystal composition is held at a temperature below TδS and warmed to reach the operation temperature for display. As a result, the above various properties of the liquid crystal composition cannot be restored to those at an initial stage. This leads to deterioration in display characteristics of the liquid crystal device using such a liquid crystal composition and poses a problem at the time of storage or use of the liquid crystal device at a low-temperature.

A liquid crystal composition is considerably stable in a supercooling state when it is contained in a cell, so that the liquid crystal composition is not crystallized or localized even at a temperature below a melting point thereof in a bulk state in many cases.

As described above, we have found that a critical value of a storage temperature at a low-temperature side is fixed by TδS rather than fixed by the melting point.

In the above-mentioned C1 alignment state, i.e., a state where a layer inclination angle S, a pretilt angle a, a cone angle ⒽⒽ, and an apparent tilt angle satisfy the following relationships of: Ⓗ<α+δ, α<δ and Ⓗ<θa Ⓗ/2; the above-mentioned changes in a contrast ratio C/R and an alignment state are noticeably observed. Herein, a change of an alignment state means: appearance of an alignment state showing a considerably low contrast ratio not satisfying the condition of: Ⓗ>θa >Ⓗ/2; occurrence of "streak defect" in the direction substantially perpendicular to a rubbing direction; and/or occurrence of "deviation of the darkest axis" wherein two parts of a liquid crystal in different two stable states before storage at low-temperature becomes not equivalent after storage at low-temperature, i.e., each of θa or the direction of an axis of one extinct position (the darkest axis) with respect to the two parts which are caused to be placed in one stable state of the two stable states is subtly different from each other. The deviation of the darkest axis is maintained even when the liquid crystal is heated to a temperature range of SmA.

SUMMARY OF THE INVENTION

An object of the present invention is to provide a liquid crystal composition effective for alleviating the temperature-dependence of driving conditions in a wide temperature range including room temperature and decreasing changes in a layer inclination angle δ, an apparent tilt angle θa, a contrast ratio C/R and alignment states.

Another object of the present invention is to provide a liquid crystal device and a display apparatus using such a liquid crystal composition.

We have accomplished the present invention by using a ferroelectric liquid crystal composition characterized by showing a particular temperature characteristic of a layer inclination angle δ. It is possible to prevent the above-mentioned change in an alignment state in an ambient temperature range by using a temperature dependence of the layer inclination angle δ such that the layer inclination angle δ increases on temperature decrease down to a mediate temperature and decreases on temperature decrease below the mediate temperature and then keeps a positive value in the ambient temperature range.

It is also possible to prevent the above-mentioned changes in a contrast ratio and an alignment state even after a storage test at a temperature lower than the lowest temperature of an ordinary storage temperature range by using a temperature dependence of the layer inclination angle δ such that the layer inclination angle δ increases on temperature decrease down to a mediate temperature and decreases on temperature decrease below the mediate temperature and then starts to increase again on further temperature decrease before it reaches zero degrees.

According to a first aspect of the present invention, there is provided a liquid crystal composition comprising a ferroelectric liquid crystal and showing a layer inclination angle δ in smectic phase, wherein the layer inclination angle δ has a temperature dependence such that the layer inclination angle δ increases on temperature decrease down to a mediate temperature and decreases on temperature decrease below the mediate temperature and then keeps a positive value in an ambient temperature range.

According to a second aspect of the present invention, there is provided a liquid crystal composition comprising a ferroelectric liquid crystal and showing a layer inclination angle δ in smectic phase, wherein the layer inclination angle δ has a temperature dependence such that the layer inclination angle δ increases on temperature decrease down to a mediate temperature and decreases on temperature decrease below the mediate temperature and then starts to increase again on further temperature decrease before it reaches zero degrees.

According to a third aspect of the present invention, there is provided a liquid crystal device, comprising: a pair of substrates and a liquid crystal disposed between the substrates, each of the substrates having thereon an electrode for applying an electric field to the liquid crystal composition:

wherein the liquid crystal comprising a ferroelectric liquid crystal shows a layer inclination angle δ in smectic phase, the layer inclination angle δ having a temperature dependence such that the layer inclination angle δ increases on temperature decrease down to a mediate temperature and decreases on temperature decrease below the mediate temperature and then keeps a positive value in an ambient temperature range.

According to a fourth aspect of the present invention, there is provided a liquid crystal device, comprising: a pair of substrates and a liquid crystal disposed between the substrates, each of the substrates having thereon an electrode for applying an electric field to the liquid crystal composition:

wherein the liquid crystal comprising a ferroelectric liquid crystal shows a layer inclination angle δ in smectic phase, the layer inclination angle δ having a temperature dependence such that the layer inclination angle δ increases on temperature decrease down to a mediate temperature and decreases on temperature decrease below the mediate temperature and then starts to increase again on further temperature decrease before it reaches zero degrees.

According to a fifth aspect of the present invention, there is provided a liquid crystal device, comprising: a pair of substrates and a liquid crystal comprising a ferroelectric liquid crystal disposed between the substrates, each of the substrates having thereon an electrode for applying an electric field to the liquid crystal, the substrates having been subjected to alignment treatment giving uniaxial alignment axes intersecting each other at a prescribed angle so as to align the liquid crystal;

wherein the liquid crystal is placed in such an alignment state that the liquid crystal shows a pretilt angle α, a cone angle Ⓗ, a layer inclination angle δ in smectic phase satisfying relationships of: Ⓗ<α+δ and α>δ;

the liquid crystal is further placed in such an alignment state that the liquid crystal molecules are oriented to at least two optically stable states which form an angle 2θa therebetween (θa; apparent tilt angle), the apparent tilt angle θa and the cone angle Ⓗ satisfying a relationship of: Ⓗ>θa> Ⓗ/2; and the layer inclination angle δ has a temperature dependence such that the layer inclination angle δ increases on temperature decrease down to a mediate temperature and decreases on temperature decrease below the mediate temperature and then keeps a positive value in an ambient temperature range.

According to a sixth aspect of the present invention, there is provided a liquid crystal device, comprising: a pair of substrates and a liquid crystal comprising a ferroelectric liquid crystal disposed between the substrates, each of the substrates having thereon an electrode for applying an electric field to the liquid crystal, the substrates having been subjected to alignment treatment giving uniaxial alignment axes intersecting each other at a prescribed angle so as to align the liquid crystal;

wherein the liquid crystal is placed in such an alignment state that the liquid crystal shows a pretilt angle α, a cone angle Ⓗ, a layer inclination angle δ in smectic phase satisfying relationships of: Ⓗ>α+δ and α<δ;

the liquid crystal is further placed in such an alignment state that the liquid crystal molecules are oriented to at least two optically stable states which form an angle 2θa therebetween (θa; apparent tilt angle), the apparent tilt angle θa and the cone angle Ⓗ satisfying a relationship of: Ⓗ>θaθ Ⓗ/2; and the layer inclination angle δ has a temperature dependence such that the layer inclination angle δ increases on temperature decrease down to a mediate temperature and decreases on temperature decrease below the mediate temperature and then starts to increase again on further temperature decrease before it reaches zero degrees.

According to a seventh aspect of the present invention, there is provided a liquid crystal apparatus including: any one of the above-mentioned liquid crystal devices, a driving circuit for the liquid crystal device, and a light source.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
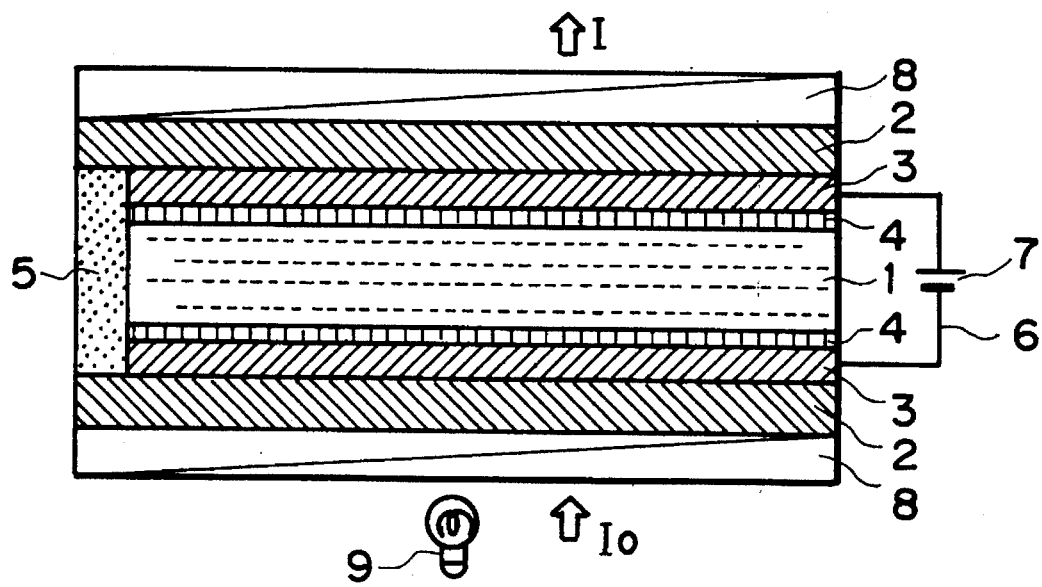
FIG. 1 is a schematic sectional view of an embodiment of the liquid crystal device according to the present invention.
Figure 2:
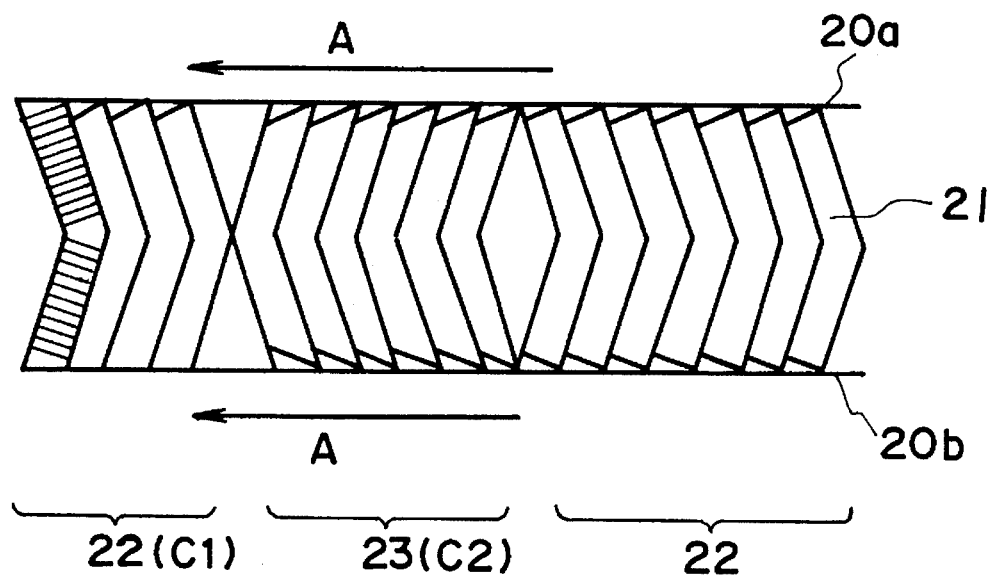
FIG. 2 is an illustration of C1 and C2 alignment states.
Figure 3A:
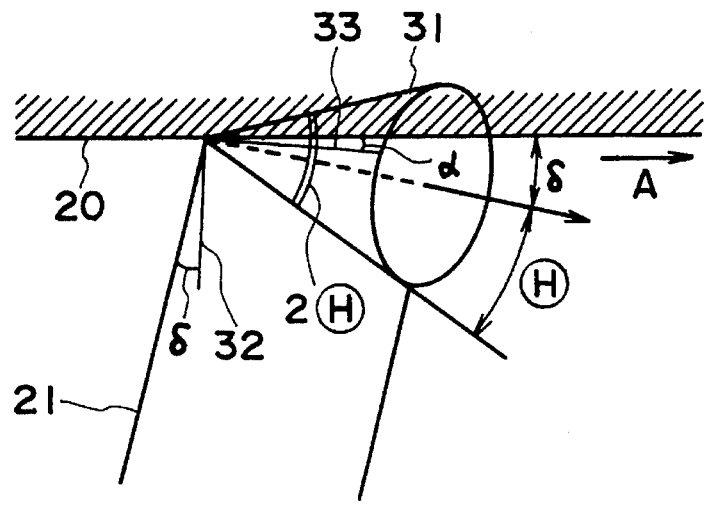
FIGS. 3A and 3B are illustrations of relationship among a cone angle, a pretilt angle and a layer inclination angle in C1 alignment and C2 alignment, respectively.
Figure 3B:
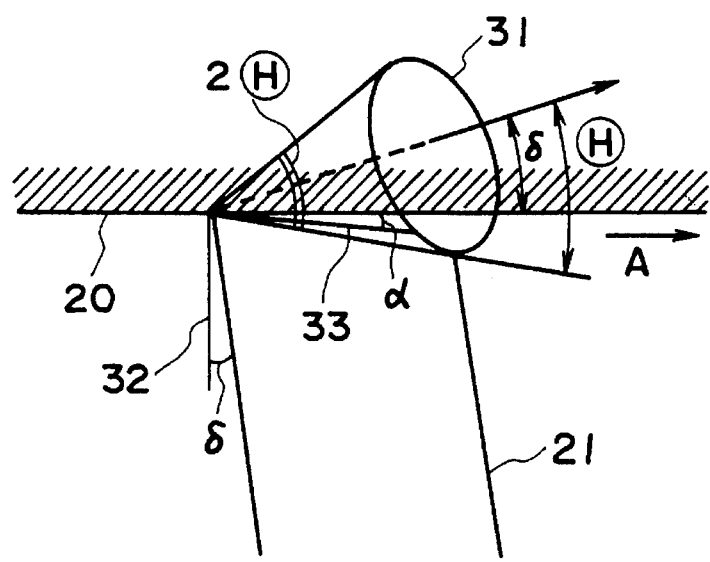

In the present invention, a term "ambient temperature range" means an operation (or service) temperature range or a storage temperature range at which a liquid crystal device (or apparatus) is actually used or in storage. Generally, an ambient temperature range varies a temperature range of about −30° C. to about 70° C. More specifically, an ambient temperature range of a particular liquid crystal device (or apparatus) which will be used or stored in a specific area (or region) may be defined as an entire temperature range where the liquid crystal device (or apparatus) is exposed and also as a possible temperature range where a temperature at which the liquid crystal device is placed can be fluctuated. In the present invention, the ambient temperature range, for example, means an annual average minimum temperature +10° C., preferably the annual average temperature, in the specific area where the liquid crystal device is intended to be used or stored. As examples of a more specific value of the ambient temperature range, it is possible to adduce a temperature of 0° C., preferably −10° C., more preferably −30° C.

In a preferred embodiment of the present invention, $δ_{max}$ (i.e., a maximum of layer inclination angle δ) is at most 20 degrees, more preferably at most 15 degrees, so as to increase the picture-rewriting speed (frame frequency) of a display device.

In order to realize the above-mentioned temperature characteristics of the layer inclination angle δ, the liquid crystal composition of the present invention may preferably comprise at least one indan-type compound represented by the following formula (I):

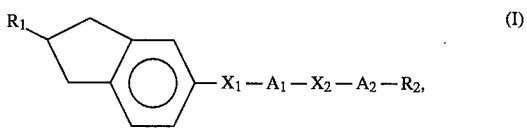

wherein $R_1$ and $R_2$ independently denote hydrogen,

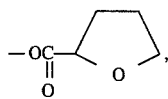

halogen, or a linear or branched alkyl group having 1–18 carbon atoms capable of including one or non-neighboring two or more —CH₂— groups which can be replaced with —O—, —S—,

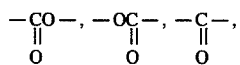

—CH=CH— or —C≡C—, the linear or branched alkyl group being capable of including hydrogen which can be replaced with fluorine;

X₁ and X₂ independently denote a single bond,

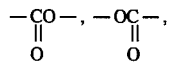

—CH₂O— or —OCH₂—;

A₁ denotes

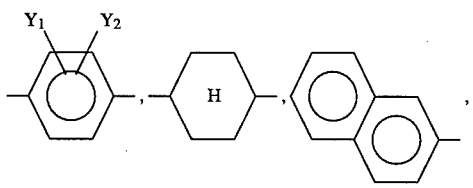

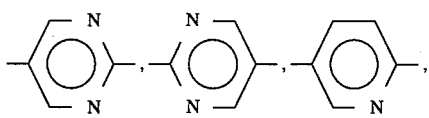

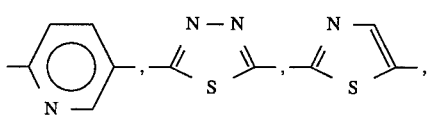

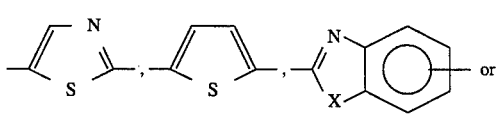

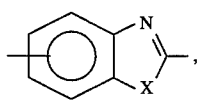

wherein Y₁ and Y₂ independently denote H, F, Cl, Br, —CH₃, —CF₃ or —CN; and X denotes O or S;

A₂ denotes a single bond or A₁; and with the proviso that A₁ is not

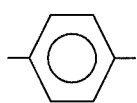

when X₁ is —COO— and A₂ is a single bond.

Preferred examples of the indan-type compound of the formula (I) may include those enumerated below:

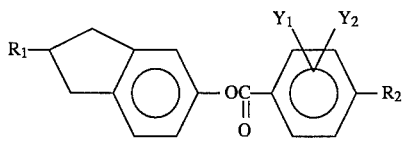

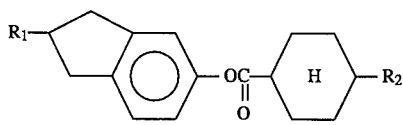

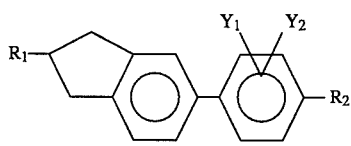

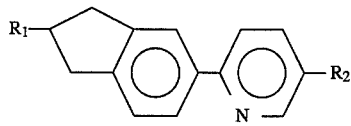

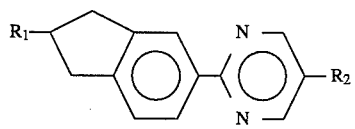

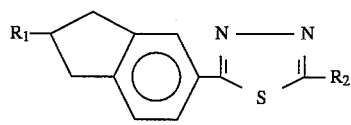

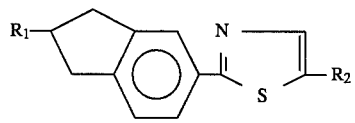

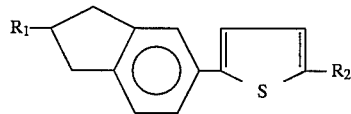

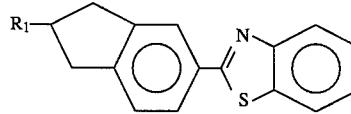

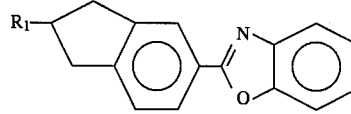

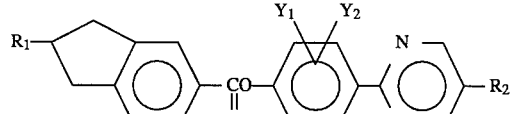

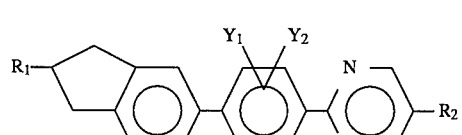

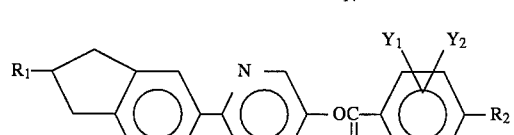

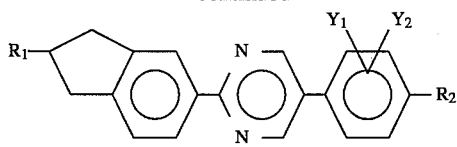

Wherein R₁ and R₂ independently denote a linear or branched alkyl group having 1–18 carbon atoms capable of including one or non-neighboring two or more —CH₂— groups which can be replaced with —O—, —S—, —COO—, —OCO—, —CO—, —CH=CH— or —C≡C— and capable of including a hydrogen atom which can be replaced with a fluorine atom.

The liquid crystal composition of the present invention may preferably contain 5–80 wt. %, more preferably 10–80 wt. %, particularly 10–40 wt. %, of the above indan-type compound of the formula (I).

Further, in order to realize a wider temperature range of SmC* including room temperature, easiness of controlling response speed, and the above-mentioned temperature characteristics, the liquid crystal composition may preferably comprise at least one of the above-mentioned indan-type compound of the formula (I) and at least one pyrimidine-type compound represented by the following formula (II):

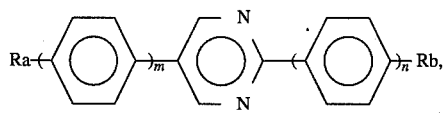 (II)

wherein Ra and Rb independently denote a linear or branched alkyl group having 1–20 carbon atoms capable of including one or non-neighboring two —CH₂— groups which can be replaced with —O—,

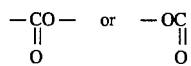

—CH₂— groups capable of including hydrogen which can be replaced with Cl, F or —CF₃; and m and n are 0, 1 or 2 with the proviso that m+n=1 or 2.

Preferred examples of the pyrimidine-type compound of the formula (II) may include those enumerated below:

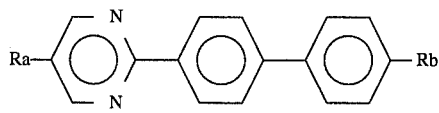

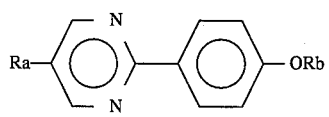

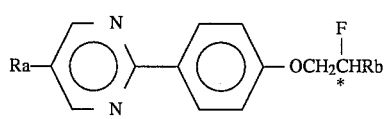

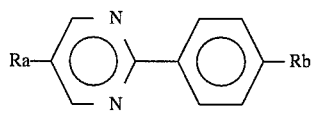

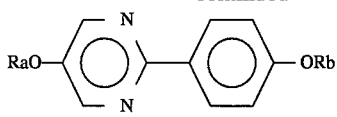

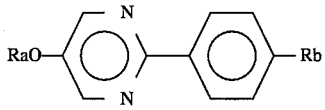

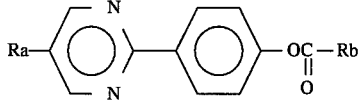

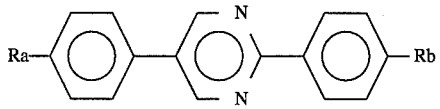

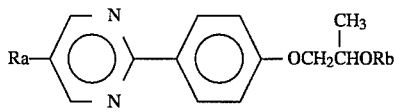

Wherein Ra and Rb independently denote a linear or branched alkyl group having 1–18 carbon atoms capable of having a substituent including F etc.

The liquid crystal composition of the present invention may preferably contain 5–80 wt. %, more preferably 20–80 wt. %, particularly 10–40 wt. %, of the indan-type compound of the formula (I) and 5–80 wt. %, more preferably 10–80 wt. %, particularly 10–40 wt. %, of the pyrimidine-type compound of the formula (II).

In the present invention, the liquid crystal composition may comprise another mesomorphic compound.

Examples of such another mesomorphic compound may include those represented by formulae (III)–(V) shown below.

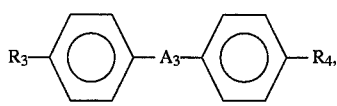 (III)

wherein R₃ and R₄ independently denote a linear or branched alkyl group having 1–20 carbon atoms capable of including one or non-neighboring two —CH₂— groups which can be replaced with —O—, —COO— or —OCO—, and A₃ denotes

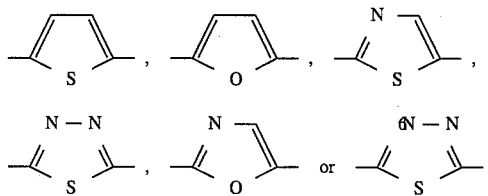

Preferred examples of the mesomorphic compound of the formula (III) may include those listed below:

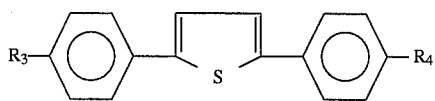

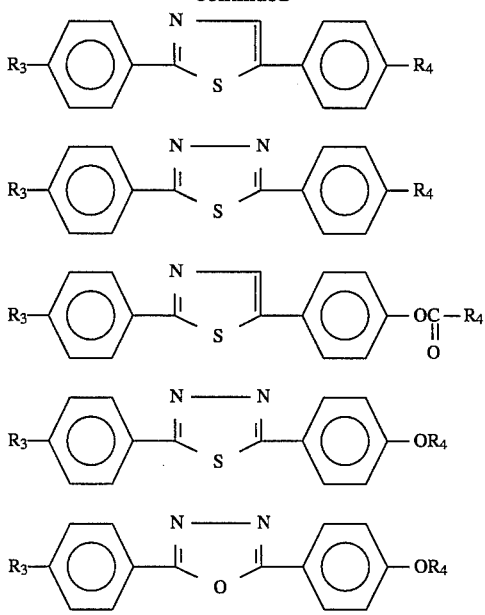

Wherein $R_3$ and $R_4$ independently denote a linear or branched alkyl group having 1–18 carbon atoms capable of having a substituent including F etc.

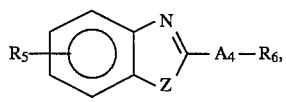   (IV)

wherein $R_5$ and $R_6$ independently denote a linear or branched alkyl group having 1–20 carbon atoms capable of including one or non-neighboring two —CH$_2$— groups which can be replaced with —O—, —COO—0 or —OCO—; Z denotes —O— or —S—; and $A_4$ denotes

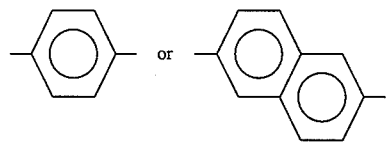

Preferred examples of the mesomorphic compound of the formula (IV) may include those listed below:

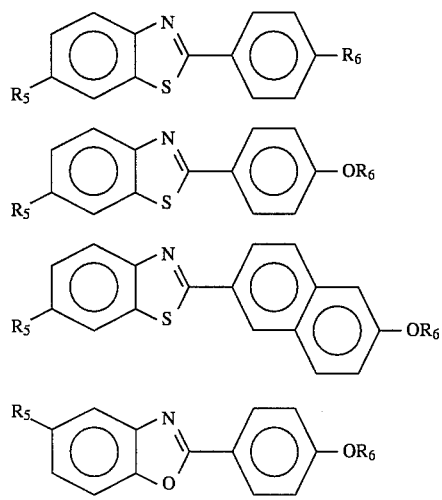

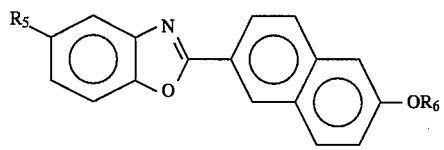

Wherein $R_5$ and $R_6$ independency denote a linear or branched alkyl group having 1–18 carbon atoms capable of having a substituent including F etc.

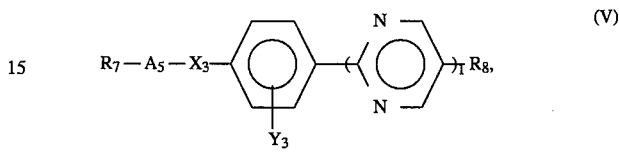   (V)

wherein $R_7$ denotes hydrogen atom, Cl, F, —CF$_3$, —CN, or a linear or branched alkyl group having 1–20 carbon atoms capable of including one or non-neiboring two —CH$_2$— groups which can be replaced with —O—, —COO— or —OCO—; $R_8$ denotes a linear or branched alkyl group having 1–20 carbon atoms capable of including one or non-neighboring two —CH$_2$— groups which can be replaced with —O—, —COO— or —OCO—; $A_5$ denotes

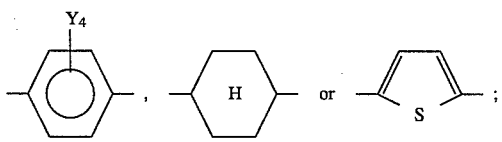

wherein $Y_4$ denotes hydrogen atom, fluorine atom, —CF$_3$ or —CN; $X_3$ denotes —COO— or —CH$_2$O—; $Y_3$ denotes hydrogen atom or fluorine atom; and 1 is 0 or 1.

Preferred examples of the mesomorphic compound of the formula (V) may include those listed below:

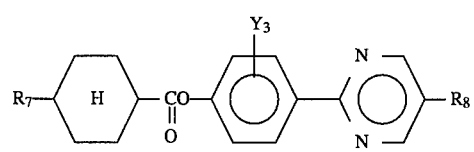

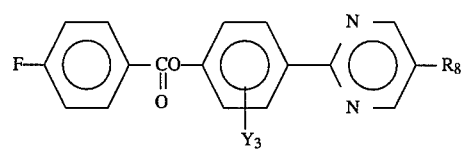

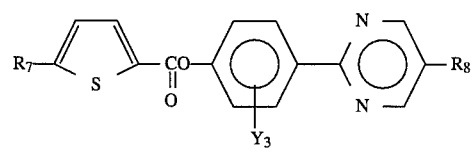

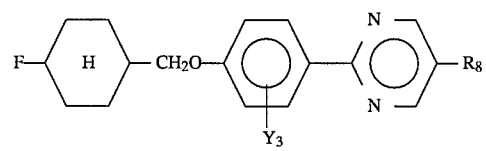

Wherein $R_7$ and $R_8$ independently denote a linear or branched alkyl group having 1–18 carbon atoms capable of having a substituent including F etc.

In the case where a liquid crystal device using a liquid crystal placed in C1 alignment state providing two uniform states is used, considerable changes in a contrast ratio and the alignment states due to the above-mentioend low-temperature storage are observed.

Accordingly, the liquid crystal device according to the present invention may preferably comprise the above liquid crystal placed in C1 uniform alignment state showing a temperature dependence of a layer inclination angle $\delta$ in smectic phase such that:

(1) the layer inclination angle $\delta$ increases on temperature decrease down to a mediate temperature (providing a maximum) and decreases on temperature decrease below the mediate temperature and keeps a positive value in an ambient temperature range, or (2) the layer inclination angle $\delta$ increases on temperature decrease down to a mediate temperature (providing a maximum) and decreases on temperature decrease below the mediate temperature and starts to increase again on further temperature decrease before it reaches zero degrees.

FIG. 1 is a schematic sectional view of a preferred embodiment of the liquid crystal device of the present invention using a chiral smectic liquid crystal layer for describing a structure of the liquid crystal device utilizing ferroelectricity.

Referring to FIG. 1, the liquid crystal device includes a chiral smectic liquid crystal layer 1 disposed between a pair of glass substrates 2 each having thereon a transparent electrode 3 and an insulating alignment control layer 4. Lead wires 6 are connected to the electrodes 3 so as to apply a driving voltage to the liquid crystal layer 1 from a power supply 7. Outside the substrates 2, a pair of polarizers 8 are disposed so as to modulate incident light $I_0$ from a light source 9 in cooperation with the liquid crystal 1 to provide modulated light I.

Each of two glass substrates 2 is coated with a transparent electrode 3 comprising a film of $In_2O_3$, $SnO_2$ or ITO (indium-tin-oxide) to form an electrode plate. Further thereon, an insulating alignment control layer 4 is formed by rubbing a film of a polymer such as polyimide with gauze or acetate fiber-planted cloth so as to align the liquid crystal molecules in the rubbing direction. Further, it is also possible to compose the alignment control layer of two layers, e.g., by first forming an insulating layer of an inorganic material, such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, or magnesium fluoride, and forming thereon an alignment control layer of an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, or photoresist resin. Alternatively, it is also possible to use a single layer of inorganic insulating alignment control layer or organic insulating alignment control layer. An inorganic insulating alignment control layer may be formed by vapor deposition, while an organic insulating alignment control layer may be formed by applying a solution of an organic insulating material or a precursor thereof in a concentration of 0.1 to 20 wt. %, preferably 0.2–10 wt. %, by spinner coating, dip coating, screen printing, spray coating or roller coating, followed by curing or hardening under prescribed hardening condition (e.g., by heating). The inorganic insulating layer may have a thickness of ordinarily 30 Å–1 μm, preferably 40–3000 Å, further preferably 40–1000 Å.

The two glass substrates 2 with transparent electrodes 3 (which may be inclusively referred to herein as "electrode plates") and further with insulating alignment control layers 4 thereof are held to have a prescribed (but arbitrary) gap with a spacer 5. For example, such a cell structure with a prescribed gap may be formed by sandwiching spacers of silica beads or alumina beads having a prescribed diameter with two glass plates, and then sealing the periphery thereof with, e.g., an epoxy adhesive. Alternatively, a polymer film or glass fiber may also be used as a spacer. Between the two glass plates, a chiral smectic liquid crystal is sealed up to provide a ferroelectric liquid crystal layer in a thickness of generally 0.5 to 20 μm, preferably 1 to 5μm.

It is desired that the liquid crystal 1 has an SmC* phase (chiral smectic C phase) in a broad temperature range including room temperature, particular at a lower temperature side thereof, and provides a device showing a broad drive voltage margin and a broad drive temperature margin.

Further, in order to show a monodomain state in a good alignment characteristic in a device, it is preferred that the liquid crystal has a phase transition series of isotropic-Ch (cholesteric) phase-SmA (smectic A) phase-SmC* (chiral smectic C) phase.

The transparent electrodes 3 are connected to the external power supply 7 through the lead wires 6. Further, outside the glass substrates 2, polarizers 8 are applied. The device shown in FIG. 1 is of a transmission type.

A liquid crystal apparatus according to the present invention may include the above-mentioned liquid crystal device, a driving circuit for the liquid crystal device, and a light source.

Figure 4:
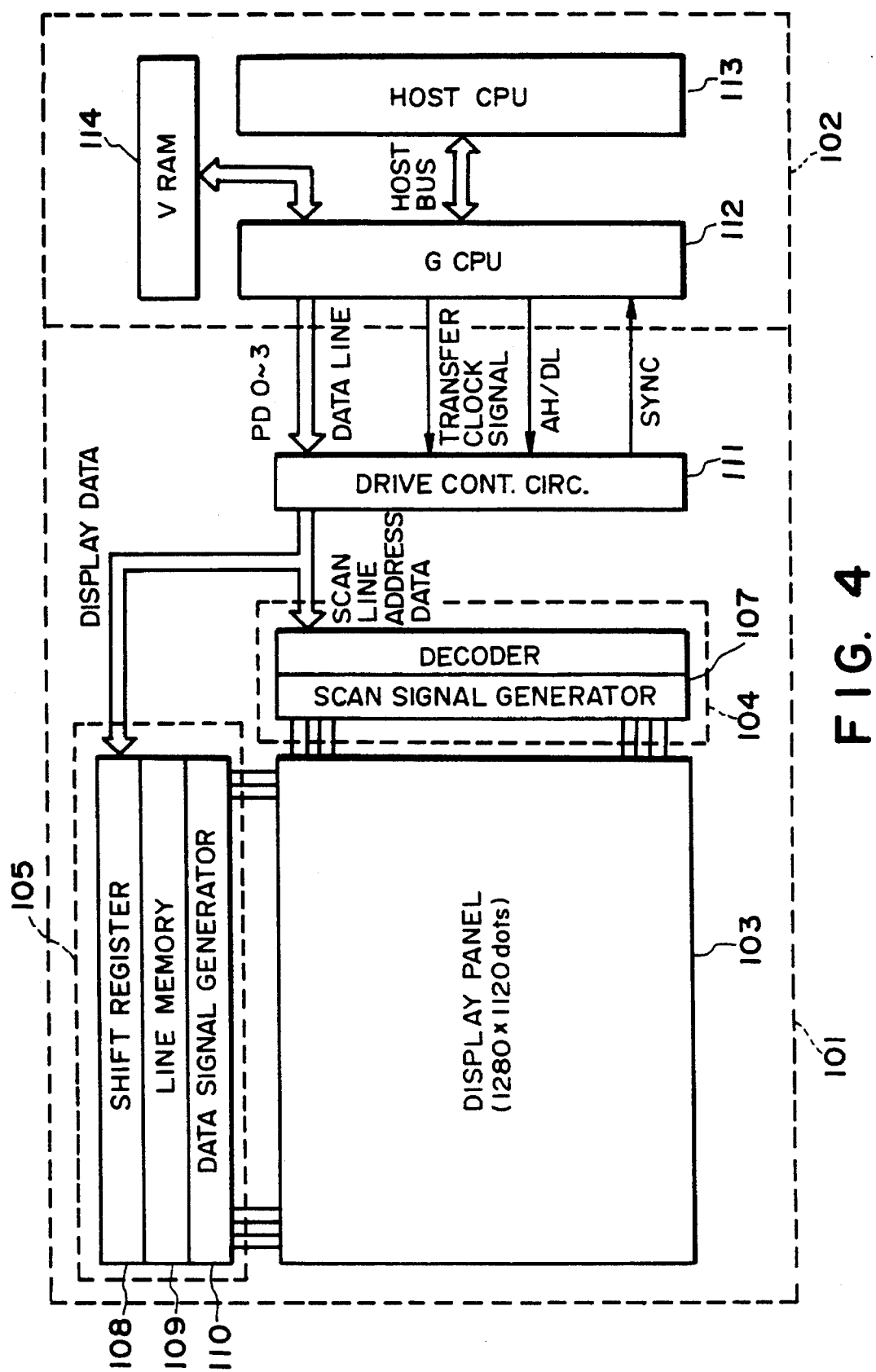
FIG. 4 is a block diagram of a liquid crystal apparatus and a graphic controller.
Figure 5:
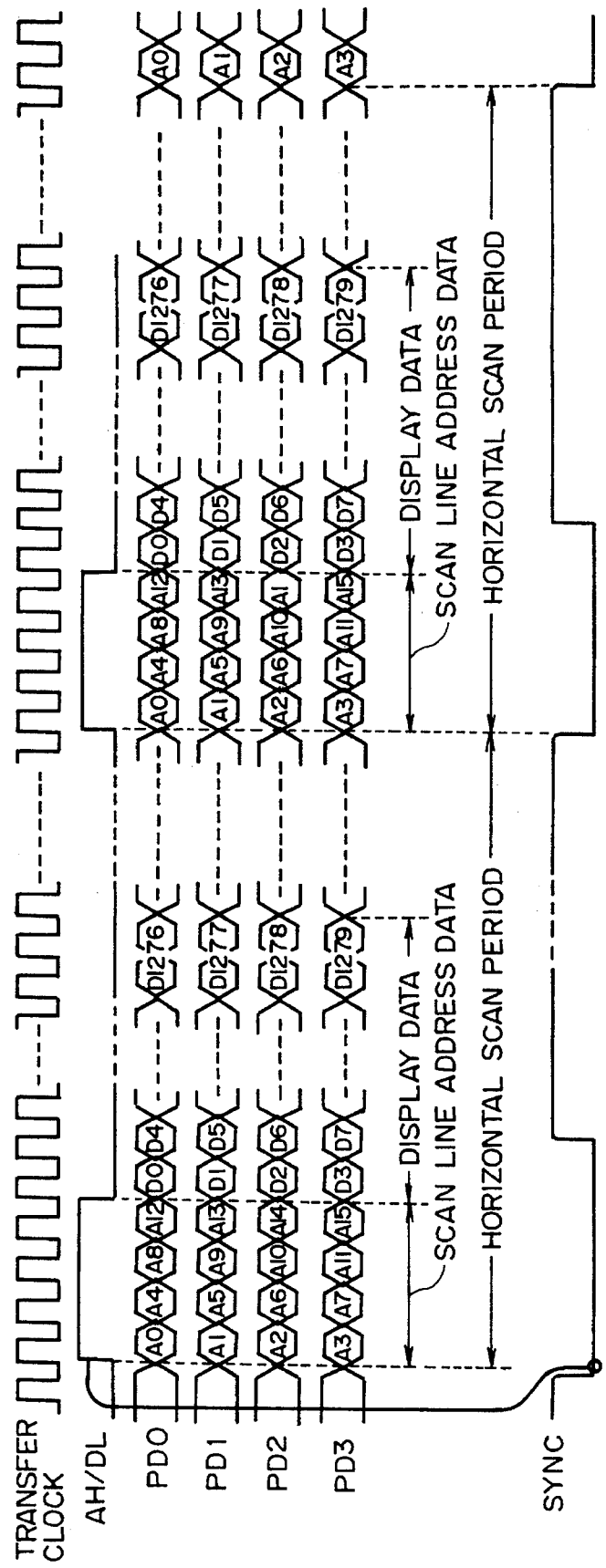
FIG. 5 is a time chart showing time correlation for image data communication between the liquid crystal apparatus and the graphic controller.

A liquid crystal apparatus may be constituted by using the liquid crystal device of the present invention for a display panel and by adopting an arrangement and data format comprising image data accompanied with scanning line address data and also a communication synchronization scheme using a SYNC signal as shown in FIGS. 4 and 5.

Image data are generated in a graphic controller 102 in an apparatus body and transferred to the display panel 103 (illuminated with a backlight (not shown)) by signal transfer means shown in FIGS. 4 and 5. The graphic controller 102 principally comprises a CPU (or GCPU, central processing unit) 112 and a VRAM (video-RAM, image data storage memory) 114 and is in charge of management and communication of image data between a host CPU 113 and the liquid crystal display apparatus (FLCD) 101. The control of image display according to the present invention is principally accomplished by the graphic controller 102. Incidentally, a light source is disposed at the back of the display panel.

The values of cone angle Ⓗ, apparent tilt angle θa layer inclination angle $\delta$, contrast ratio C/R and pretilt angle α referred to herein are based on values measured according to the following methods.

Measurement of cone angle Ⓗ

An FLC (ferroelectric liquid crystal) device was sandwiched between right angle-cross nicol polarizers and rotated horizontally relative to the polarizers under application of an AC voltage of ±30 V to ±50 V and 100 Hz between the upper and lower substrates of the device while measuring a transmittance through the device by a photomultiplier (available from Hamamatsu Photonics K.K.) to find a first extinct position (a position providing the lowest transmittance) and a second extinct position. A cone angle Ⓗ was measured as a half of the angle between the first and second extinct positions.

Measurement of apparent tilt angle θa

An FLC device sandwiched between right angle cross nicol polarizes was supplied with a single pulse of one polarity exceeding the threshold voltage of the ferroelectric liquid crystal and was then rotated under no electric field horizontally relative to the polarizers to find a first extinction position. Then, the FLC device was supplied with a single pulse of the opposite polarity exceeding the threshold voltage of the ferroelectric liquid crystal and was then rotated under no electric field relative to the polarizers to find a second extinct position. An apparent tilt angle θa was measured as a half of the angle between the first and second extinct positions.

Measurement of layer inclination angle δ

The method used was basically similar to the method used by Clark and Largerwal (Japanese Display '86, Sep. 30–Oct. 2, 1986, p.p. 456–458) or the method of Ohuchi et al (J.J.A.P., 27 (5) (1988), p.p. 725–728). The measurement was performed by using a rotating anode-type X-ray diffractometer using CuKα X-rays (available from MAC Science) as a measurement apparatus. An 80 μm-thick glass ("Micro Sheet" available from Corning Glass Works) was used as a glass substrate in order to minimize the X-ray absorption with the glass substrate, otherwise an ordinary step of forming a liquid crystal cell was conducted.

More specifically, in order to obtain a gap or distance between liquid crystal layers, a bulk liquid crystal was applied onto a sample glass. The gap was obtained by effecting 2θ/θ scan in the same manner as in powder X-ray diffraction analysis. A layer inclination angle δ was measured in the following manner. A cell having a gap of 80 μm was prepared by using a pair of the above-mentioned 80 μm-thick glass substrates and a spacer comprising a 80 μm-thick glass identical to the above substrates. The cell was filled with a liquid crystal at a temperature of isotropic liquid and then gradually cooled while applying a magnetic field to the cell in the direction parallel to the substrates in an electromagnet, thus preparing a sample cell which had been subjected to a homogeneous alignment treatment. An X-ray detector was set to a diffraction angle 2θ providing the above-obtained layer gap and then the sample cell was subjected to θ scan, thus obtaining the layer inclination angle δ according to the above-mentioned method. In the case where the above-mentioned magnetically aligned 80 μm-thick cell is changed to a cell having a cell gap of 1.2 m prepared by using an alignment film (LP-64, available from Hitachi Kasei Kogyo K.K.) and rubbing the alignment film, it is possible to obtain values of a layer inclination angle δ in the temperature range of −20° to 60° C. substantially identical to those measured by the above-mentioned method. When alignment films SP-710 and SP-510 also provided values of δ substantially identical to those in the case of the alignment film LP-64. In this instance, the alignment films SP-710 and SP-510 provided a pretilt angle α of 1 to 3 degrees. However, when an alignment film LQ-1802 (available from Hitachi Kasei Kogyo K.K.) was used instead of the alignment film LP-64, the alignment film LQ-1802 provided a pretilt angle α of 8 to 25 degrees and also provided larger values of δ than those measured by using the magnetically aligned cell or the alignment film LP-64 by 0.2 to 2 degrees. In this instance, the values of δ are inherent in the liquid crystal cells used.

The values indicated in Examples and Comparative Examples (including Reference Example 1) mean those measured by using the above-mentioned magnetically aligned 80 μm-thick cell unless a particular mention is made thereof.

Rieker et al show the following relationship between a layer inclination angle δ, a gap $d_C$ between SmC* layers, and a gap $d_A$ between SmA layers (""Chevron" Local Layer Structure in Surface-Stabilized Ferroelectric Smectic-C Cells", Phys. Rev. Lett., 59, p. 2658 (1987):

$$\cos\delta = d_C/d_A.$$

Measurement of contrast ration C/R

A liquid crystal device was sandwiched between right angle-cross nicol polarizers and rotated horizontally relative to the polarizers under application of a peak-to-peak voltage Vpp of 30 V (driving wave form) between the upper and lower substrates of the device while measuring an output voltage through the device by the above-mentioned photomultiplier to find a first extinct position. The device was fixed at the position. Then, the observation position was changed or rewritten to a clear (or light) state by applying a corresponding driving waveform and an output voltage was measured under the condition. A contrast ratio C/R was measured as a ratio of the output voltage in the clear state to the output voltage at the first extinct position (i.e., in a dark state).

Measurement of pretilt angle α

The measurement was performed according to the crystal rotation method as described at Jpn. J. Appl. Phys. vol. 19 (1980), No. 10, Short Notes 2013.

More specifically, a cell was filled with a standard liquid crystal mixture for measurement assuming SmA phase in the temperature range of 10°–55° C. obtained by mixing 80 wt. % of a ferroelectric liquid crystal ("CS-1014", mfd. by Chisso K.K.) with 20 wt. % of a compound represented by the following formula:

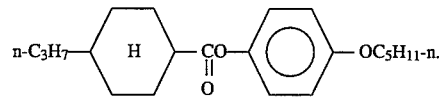

For measurement, the liquid crystal cell was rotated in a plane perpendicular to the pair of substrates and including the aligning treatment axis (rubbing axis) and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

A pretilt angle α was obtained through a simulation wherein a fitting of a spectrum of the intensity of the transmitted light formed by interference was effected to the following theoretical curves (a) and (b):

$$T(\phi) = \cos^2\left[\frac{\pi d}{\lambda}\left(\frac{NeNo\sqrt{N^2(\alpha) - \sin^2\phi}}{N^2(\alpha)} - \sqrt{No^2 - \sin^2\phi} - \frac{Ne^2 - No^2}{N^2(\alpha)}\sin\alpha\cos\alpha\sin\phi\right)\right], \quad (a)$$

$$N(\alpha) \equiv \sqrt{No^2 \cdot \cos^2\alpha + Ne^2 \cdot \sin^2\alpha}, \quad (b)$$

wherein No denotes the refractive index of ordinary ray, Ne denotes the refractive index of extraordinary ray, φ denotes the rotation angle of the cell, T(φ) denotes the intensity of the transmitted light, d denotes the cell thickness, and λ denotes the wavelength of the incident light.

Hereinbelow, the present invention will be described more specifically based on Examples to which the present invention is not intended to be limited, however.

In Examples and Comparative Examples appearing hereinbelow, liquid crystal compositions A to L and X were constituted by the above-mentioned indan-type compound of the formula (I), the pyrimidine-type compound of the formula (II), and the mesomorphic compounds of the formula (III)–(V). For instance, the liquid crystal compositions I, K and X were prepared by mixing the following compounds (ingredients) in proportions indicated below.

| (Composition I) | |
|---|---|
| Structural formula | wt. parts |
| $C_8H_{17}$–[pyrimidine]–[phenyl]–$OC_{10}H_{21}$ | 13 |
| $C_{10}H_{21}$–[pyrimidine]–[phenyl]–$OC_8H_{17}$ | 4 |
| $C_9H_{19}$–[pyrimidine]–[phenyl]–$OC_6H_{13}$ | 6 |
| $C_6H_{13}$–[pyrimidine]–[phenyl]–$OC_{10}H_{21}$ | 6 |
| $C_7H_{15}$–[pyrimidine]–[phenyl]–$OC_9H_{19}$ | 2 |
| $C_6H_{13}$–[pyrimidine]–[phenyl]–[phenyl]–$C_5H_{11}$ | 4.5 |
| $C_6H_{13}$–[pyrimidine]–[phenyl]–[phenyl]–$C_7H_{15}$ | 4.5 |
| $C_6H_{13}$–[phenyl]=N–[thiazole]–[phenyl]–$OCC_6H_{13}$O | 6 |
| $C_6H_{13}$–[phenyl]=N–[thiazole]–[phenyl]–$OCC_8H_{17}$O | 2 |
| $C_{11}H_{23}$–[pyrimidine]–[phenyl]–OC(O)–[phenyl]–$C_4H_9$ | 12 |

| (Composition I) -continued | |
|---|---|
| Structural formula | wt. parts |
| $C_{12}H_{25}$–[pyrimidine]–[phenyl]–OC(O)–[phenyl]–F | 4 |
| $C_{11}H_{23}$–[pyrimidine]–[phenyl]–OC(O)–[phenyl]–F,F | 2 |
| $C_6H_{13}$–[phenyl]=N–[thiazole]–[phenyl]–$C_9H_{19}$ | 9 |
| $C_{10}H_{21}$–[pyrimidine]–[phenyl]–$OCH_2$–$CHC_8H_{17}$ (F, *) | 10 |
| $C_{10}H_{21}$–[pyrimidine]–[indan]–$C_8H_{17}$ | 10 |
| $C_8H_{17}$–[phenyl]–[pyrimidine]–[indan]–$C_8H_{17}$ | 5 |

| (Composition K) | |
|---|---|
| Structural formula | wt. parts |
| $C_8H_{17}$–[pyrimidine]–[phenyl]–$OC_{10}H_{21}$ | 8 |
| $C_{10}H_{21}$–[pyrimidine]–[phenyl]–$OC_8H_{17}$ | 9 |
| $C_9H_{19}$–[pyrimidine]–[phenyl]–$OC_6H_{13}$ | 6 |
| $C_6H_{13}$–[pyrimidine]–[phenyl]–$OC_{10}H_{21}$ | 6 |

(Composition K)

| Structural formula | wt. parts |
|---|---|
| C₇H₁₅–[pyrimidine]–[phenyl]–OC₉H₁₉ | 2 |
| C₈H₁₇–[pyrimidine]–[phenyl]–OC₆H₁₃ | 6 |
| C₆H₁₃–[pyrimidine]–[phenyl]–[phenyl]–C₅H₁₁ | 7 |
| C₆H₁₃–[pyrimidine]–[phenyl]–[phenyl]–C₇H₁₅ | 7 |
| C₆H₁₃–[benzothiazole]–[phenyl]–OC₈H₁₇ | 2 |
| C₆H₁₃–[phenyl]–[thiazole]–[phenyl]–OCC₆H₁₃(=O) | 4 |
| C₆H₁₃–[phenyl]–[thiazole]–[phenyl]–OCC₈H₁₃(=O) | 5 |
| C₁₁H₂₃–[pyrimidine]–[phenyl]–OC(=O)–[thiophene]–C₄H₉ | 7 |
| C₁₂H₂₅–[pyrimidine]–[phenyl]–OC(=O)–[phenyl]–F | 5 |
| C₁₁H₂₃–[pyrimidine]–[phenyl]–OC(=O)–[phenyl]–F, F | 1 |
| C₆H₁₃–[phenyl]–[thiazole]–[phenyl]–C₉H₁₉ | 11 |
| C₈H₁₇–[phenyl]–[thiazole]–[phenyl]–C₁₀H₂₁ | 1 |

(Composition K)

| Structural formula | wt. parts |
|---|---|
| C₄H₉–[benzoxazole]–[naphthalene]–OC₁₀H₂₁ | 3 |
| C₁₀H₂₁–[pyrimidine]–[phenyl]–OCH₂–CHFC₇H₁₇* | 10 |

(Composition X)

| Structural formula | wt. parts |
|---|---|
| C₅H₁₁–[phenyl]–C(=N–N)S–[phenyl]–C₅H₁₁ | 5 |
| C₆H₁₃–[phenyl]–C(=N–N)S–[phenyl]–C₆H₁₃ | 5 |
| C₄H₉–[thiophene]–C(=O)O–[phenyl]–[pyridine]–C₁₁H₂₃ | 6.7 |
| C₄H₉–[thiophene]–C(=O)O–[phenyl(F)]–[pyridine]–C₁₁H₂₃ | 3.3 |
| C₆H₁₃–[benzothiazole]–[phenyl]–OC₈H₁₇ | 20 |
| C₁₀H₂₁O–[phenyl]–C(=O)O–[phenyl]–OCH₂CH(CH₃)C₂H₅ | 26 |
| C₁₀H₂₁–[pyrimidine]–[phenyl]–OCH₂CHFC₆H₁₃* | 10 |
| C₆H₁₃–[pyridine]–[phenyl]–OC₁₂H₂₅ | 4 |
| C₈H₁₇–[pyridine]–[phenyl]–OC₉H₁₉ | 8 |

-continued (Composition X)

| Structural formula | wt. parts |
|---|---|
| C$_8$H$_{17}$—[pyrimidine ring]—[benzene ring]—OC$_{10}$H$_{21}$ | 8 |
| C$_9$H$_{19}$—[pyrimidine ring]—[benzene ring]—OC$_8$H$_{17}$ | 4 |

The liquid crystal compositions A to L and X showed the phase transistion series indicated in Table B. A total weight parts of the indan-type compounds and a total weight parts of the pyrimidine-type compounds were also shown in Table B. Further, the of δ shown in FIGS. 6–8, respectively.

X-ray diffraction analysis as follows:

TABLE 1-1

| | Layer inclination angle δ (degrees) | | | | | | |
|---|---|---|---|---|---|---|---|
| | Temperature (°C.) | | | | | | |
| L.C. | −10 | 0 | 10 | 20 | 30 | 40 | 50 |
| CS-1017 | 25.3 | 25.1 | 24.6 | 23.9 | 22.6 | 20.3 | 16.8 |

Two 0.7 mm-thick glass plates were provided and respectively coated with an ITO film to form an electrode for voltage application, which was further coated with an insulating layer of vapor-deposited SiO$_2$. The insulating layer was further coated with a 0.2% isopropyl alcohol solution of silane coupling agent ("KBM-602" available from Shin Etsu Kagaku K.K.) by spin coating at 2000 r.p.m. for 15 sec., followed by drying at 120° C. for 20 min. The glass plate thus treated was further coated with a 1.5%-solution of polyimide resin precursor (SP-510, available from Toray

TABLE B

| L.C. | Phase transition temperature (°C.) | | | | | Indan-type comp. (wt. parts) | Pyrimidine-type comp. (wt. parts) |
|---|---|---|---|---|---|---|---|
| | Cry. | SmC* | SmA | Ch. | Iso. | | |
| A | −15.2 → | ← 59.0 | ← 72.6 | ← 86.0 | | 0 | 52 |
| B | −10.4 → | ← 65.1 | ← 88.0 | ← 95.2 | | 0 | 61 |
| C | −9.9 → | ← 67.4 | ← 86.1 | ← 93.6 | | 0 | 59 |
| D | −12.5 → | ← 67.4 | ← 85.4 | ← 92.3 | | 0 | 59 |
| E | −14.5 → | ← 63.4 | ← 87.5 | ← 93.0 | | 0 | 60 |
| F | −11.0 → | ← 64.6 | ← 88.2 | ← 95.6 | | 22 | 42 |
| G | −17.7 → | ← 66.8 | ← 89.3 | ← 96.2 | | 22 | 42 |
| H | −13.6 → | ← 64.7 | ← 86.7 | ← 93.2 | | 14 | 48 |
| I | −13.2 → | ← 64.5 | ← 85.8 | ← 92.8 | | 15 | 50 |
| J | −8.3 → | ← 68.3 | ← 90.8 | ← 99.3 | | 17 | 47 |
| K | −8.5 → | ← 65.9 | ← 88.4 | ← 95.3 | | 0 | 61 |
| L | −7.9 → | ← 68.4 | ← 90.8 | ← 98.3 | | 3 | 49 |
| X | −12.6 → | ← 55.2 | ← 72.6 | ← 77.9 | | 0 | 34 |

Reference Example 1

A commercially available liquid crystal composition ("CS-1017", manufactured by Chisso K.K.) showing an ordinary temperature-dependence of layer inclination angle δ (i.e., showing a monotonously decreasing inclination angle on temperature decrease) was subjected to measurement of layer inclination angle δ, whereby the composition CS-1017 showed the temperature-dependence of layer inclination angle δ (degrees) as measured by the above-mentioned K.K.) in dimethylacetoamide by a spinner coater rotating at 2000 rpm for 15 seconds. Thereafter, the coating film was subjected to heat curing at 300° C. for 60 min. to obtain about 250 Å-thick film.

The coating film was rubbed with acetate fiber-planted cloth. The thus treated two glass plates were washed with isopropyl alcohol. After silica beads with an average particle size of 2.0 μm were dispersed on one of the glass plates, the two glass plates were applied to each other with a bonding sealing agent ("Lixon Bond", available from Chisso K.K.) so that their rubbed directions were parallel to each other and heated at 100° C. for 60 min. to form a blank cell. The cell gap was found to be about 2.0 µm as measured by a Berek compensator.

Then, the above-prepared liquid crystal composition CS-1017 was heated into an isotropic liquid, and injected into the above prepared cell under vacuum and, after sealing, was gradually cooled at a rate of 20° C./hour to 25° C. to prepare a liquid crystal device.

The liquid crystal device thus prepared was subjected measurement of response characteristic by applying a peak-to-peak voltage Vpp of 20 volts to measure a time of causing a transmittance change of 0– 90% under right angle cross nicols (hereinafter referred to as optical response time). The results are shown below.

TABLE 1-2

| L.C. | Optical response time (µsec) | | | | Temp. factor |
| | 10° C. | 20° C. | 30° C. | 40° C. | $f^{10}/40$ |
| --- | --- | --- | --- | --- | --- |
| CS-1017 | 825 | 325 | 180 | 100 | 8.25 |
| | (2.5) | (1.8) | (1.8) | | |

Temperature factor (temperature-dependence factor) $f^{10/40}$ means a ratio of optical response time at 10° C./optical response time at 40° C., and the values in the parentheses represent temperature (–dependence) factor at 10° C. increments, i.e., $f^{10/20}$, $f^{20/30}$ and $f^{30/40}$, in order.

Then, liquid crystal devices were prepared and evaluated in the same manner as described above except that the liquid crystal composition CS-1017 was changed to the liquid crystal composition B, D, J and K, respectively.

The results are shown below.

TABLE 2-1

| L.C. | Optical response time (µsec) | | | | Temp. factor |
| | 10° C. | 20° C. | 30° C. | 40° C. | $f^{10}/40$ |
| --- | --- | --- | --- | --- | --- |
| B | 142 | 103 | 78 | 59 | 2.41 |
| | (1.38) | (1.32) | (1.32) | | |
| D | 182 | 138 | 100 | 72 | 2.53 |
| | (1.32) | (1.38) | (1.39) | | |
| J | 211 | 128 | 95 | 70 | 3.01 |
| | (1.65) | (1.35) | (1.36) | | |
| K | 140 | 103 | 77 | 61 | 2.30 |
| | (1.36) | (1.34) | (1.26) | | |

Figure 6:
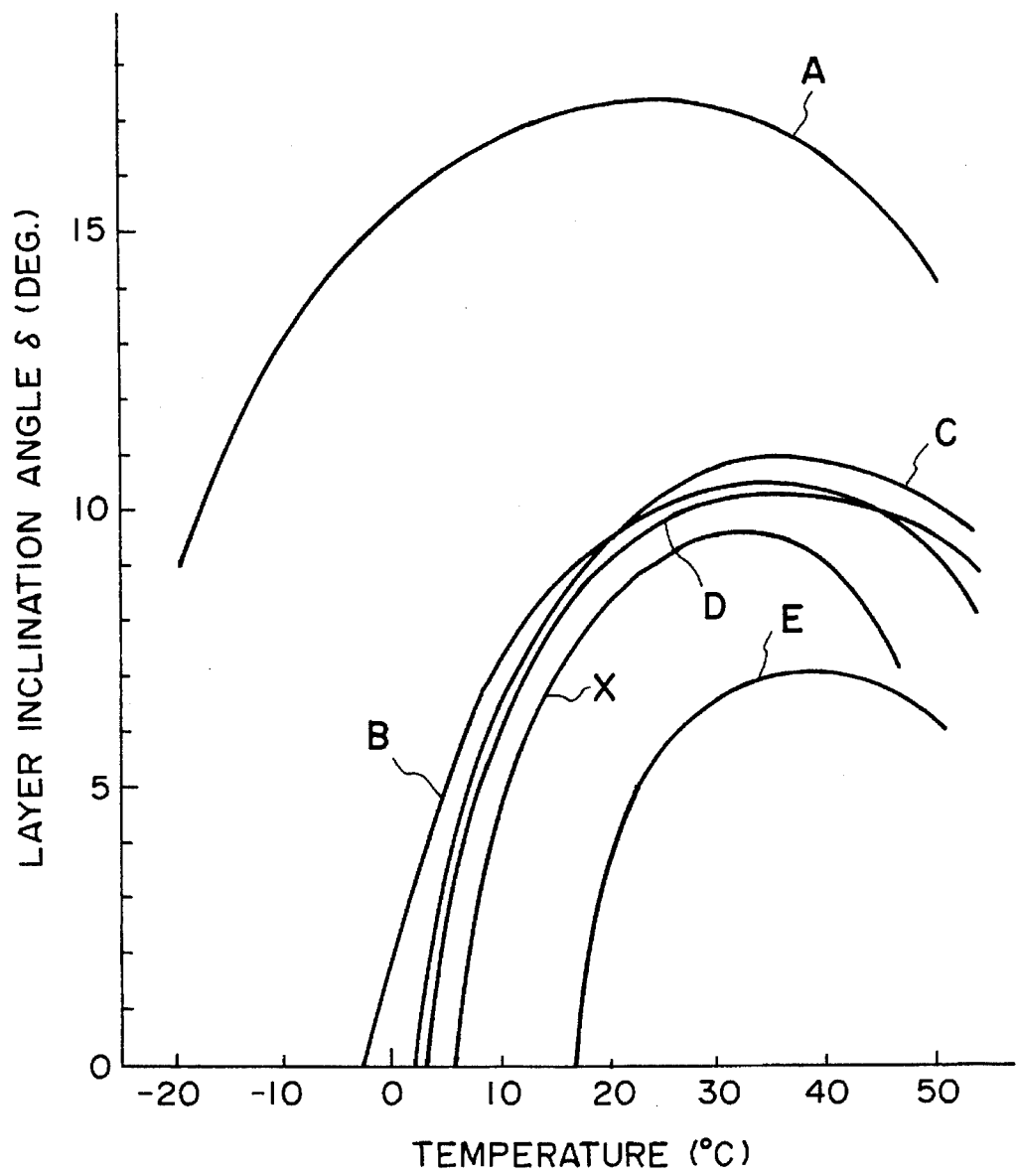
FIGS. 6–8 Are a graph showing temperature-dependence of a layer inclination angle for several liquid crystal compositions, respectively.
Figure 8:
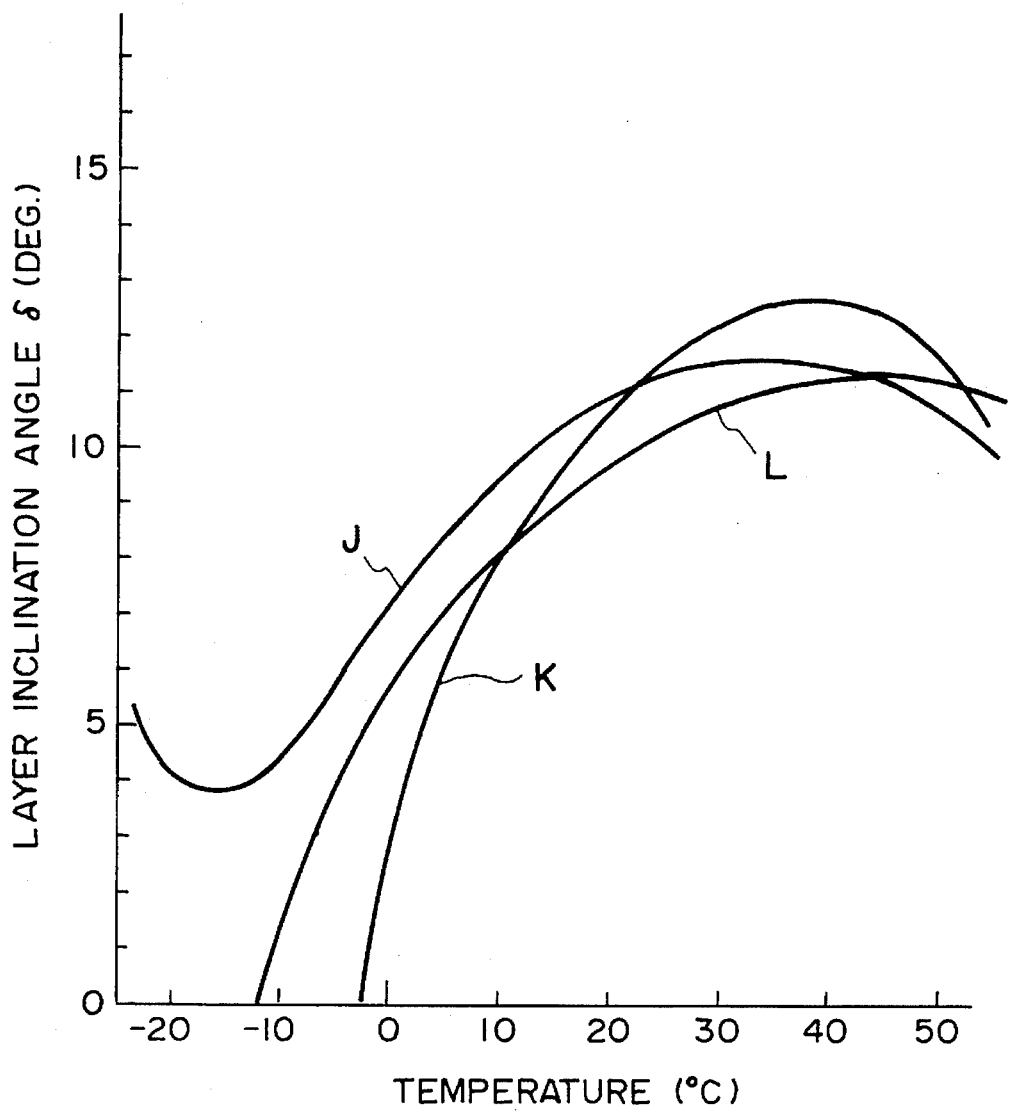

Further, each of the temperature-dependence of layer inclination angle δ with respect to the liquid crystal compositions B, D, J and K was shown in FIGS. 6 and 8, respectively.

As is understood from the above results, the liquid crystal compositions B, D, J and K having a maximum followed by a decrease of layer inclination angle δ on temperature decrease showed a smaller temperature-dependence of response time than the liquid crystal composition CS-1017 showing a monotonously increasing layer inclination angle δ, thus resulting in a remarkable difference in temperature factor $f^{10/40}$. Thus, an improvement in temperature-dependence of response speed was confirmed.

Examples 1–5 and Comparative Examples 1–9

An experiment for comparing changes in display characteristics through a low-temperature storage test by using liquid crystal compositions having a controlled temperature dependence of δ for improving a temperature dependence of response speed.

Liquid crystal devices were prepared in the same manner as in Reference Example 1 by using the above-mentioned liquid crystal compositions A to F and X except that 80 µm-thick glass plates (available from Corning Glass Works) were used instead of the 0.7 mm-thick glass plates and a polyimide resin precursor (LP-64, available from Toray K.K.) was used instead of the polyimide resin precursor SP-510. As a result, the liquid crystal devices had the following characteristics:

Thickness of the alignment film: about 50 Å,

Thickness of the cell: about 1.2 µm,

Pretilt angle α: about 2 degrees, and

Alignment state: splay state in C2 alignment.

Then, each of the above-prepared liquid crystal devices was subjected to measurement of layer inclination angle α, apparent tilt angle θa and contrast ratio C/R at 25° C.

After the measurement of δ, θa and C/R at the above initial stage (i.e., before storage at low-temperature), each of the liquid crystal devices was cooled at a rate of 1° C./minute to 0° C. and –30° C., respectively, and held for 15 minutes at the same temperatures (i.e., storage temperatures). Each of the liquid crystal devices was warmed at a rate of 1° C./minute from 0° C. and –30° C. to 25° C., respectively, and then subjected to measurement of δ, θa and C/R at 25° C. (i.e., after storage at low-temperature).

The result are shown in Tables 3-1 and 3-2 below.

TABLE 3-1

Storage Test (at 0° C. for 15 min.)

| | | | Before storage | | | (at 25° C.) After storage | | |
| Example | L.C. | Tδs*[1] | δ | θa | C/R | δ | θa | C/R |
| --- | --- | --- | --- | --- | --- | --- | --- | --- |
| Ex. | | | | | | | | |
| 1 | F | Not observed | 10.2 | 6.0 | 5:1 | 10.2 | 6.0 | 5:1 |
| 2 | A | Not observed | 17.4 | 7.1 | 8:1 | 17.4 | 7.1 | 8:1 |
| 3 | B | –3 | 10.2 | 6.1 | 5:1 | 10.2 | 6.1 | 5:1 |
| Comp. Ex. | | | | | | | | |
| 1 | C | +2 | 10.3 | 6.0 | 4:1 | 11.3 | 5.3 | 3:1 |
| 2 | D | +3 | 9.8 | 5.8 | 4:1 | 10.4 | 4.9 | 3:1 |
| 3 | X | +6 | 9.2 | 5.4 | 4:1 | 10.4 | 5.2 | 3:1 |
| 4 | E | +17 | 5.6 | 4.3 | 3:1 | 7.1 | 4.5 | 2:1 |

*[1]Herein (including the subsequent Examples and Comparative Examples), "Not Observed" means that Tδs is not observed in a temperature range of –25° C. to a temperature below a phase transition temperature (SmA → SmC*) by 5° C.

TABLE 3-2

Storage Test (at –30° C. for 15 min.)

| | | | Before storage | | | (at 25° C.) After storage | | |
| Example | L.C. | Tδs | δ | θa | C/R | δ | θa | C/R |
| --- | --- | --- | --- | --- | --- | --- | --- | --- |
| Ex. | | | | | | | | |
| 4 | F | Not observed | 10.2 | 6.0 | 5:1 | 10.2 | 6.0 | 5:1 |
| 5 | A | Not observed | 17.4 | 7.1 | 8:1 | 17.4 | 7.1 | 8:1 |
| Comp. Ex. | | | | | | | | |
| 5 | B | –3 | 10.2 | 6.1 | 5:1 | 10.8 | 5.7 | 4:1 |
| 6 | C | +2 | 10.3 | 6.0 | 4:1 | 10.9 | 5.5 | 3:1 |

TABLE 3-2-continued

| | | | Storage Test (at −30° C. for 15 min.) | | | | | |
|---|---|---|---|---|---|---|---|---|
| | | | Before storage | | | (at 25° C.) After storage | | |
| Example | L.C. | TδS | δ | θa | C/R | δ | θa | C/R |
| 7 | D | +3 | 9.8 | 5.8 | 4:1 | 10.8 | 5.4 | 3:1 |
| 8 | X | +6 | 9.2 | 5.4 | 4:1 | 10.2 | 5.0 | 3:1 |
| 9 | E | +17 | 5.6 | 4.3 | 3:1 | 7.0 | 4.8 | 2:1 |

As is understood from the above results, when the storage temperature was lower than TδS, the values of δ and θa were changed and the values of C/R were decreased, thus resulting in a deterioration in display characteristics of the liquid crystal devices. In these Examples and Comparative Examples, however, there were not observed a localization and a crystallization of the liquid crystal composition used and there were also not observed a streak defect and a deviation of the darkest axis.

Example 6 and Comparative Example 10–16

An experiment for comparing changes in display characteristics through a low-temperature storage test in uniform state in C1 alignment (C1 uniform alignment state) was performed.

Blank cells for liquid crystal devices were prepared in the same manner as in Reference Example 1 except that 1.1 mm-thick glass plates were used instead of the 0.7 mm-thick glass plates and a polyimide resin precursor (LQ-1802, available from Hitachi Kasei Kogyo K.K.) was used instead of the polyimide resin precursor SP-510. As a result, the blank cells had the following characteristics:

Thickness of the alignment film: about 250 Å, and

Thickness of the cell: about 1.2 μm.

Then, each of the liquid crystal compositions A to E and X was heated into an isotropic liquid, subjected to aging treatment for 5 hours at about 100° C., and was gradually cooled to prepare a liquid crystal device.

The thus prepared liquid crystal devices were subjected to measurement of an alignment state and values of α, ⒽⒽ, θa and δ. The liquid crystal devices using the composition A to D and X showed a C1 uniform alignment state giving a high contrast in a temperature range of 10° to 55° C. The liquid crystal device using the composition E showed a C1 uniform alignment state only in a temperature range of 30° to 45° C. Further, all the liquid crystal devices had a pretilt angle α of 18 degrees. Other results are shown in Table 4-1 below.

TABLE 4-1

| | Angles (degrees) at 25° C. | | | |
|---|---|---|---|---|
| L.C. | B | C | D | X |
| Ⓗ | 15.0 | 15.0 | 14.8 | 14.3 |
| θa | 11.0 | 11.8 | 11.6 | 10.0 |
| δ | 10.2 | 10.3 | 9.8 | 9.2 |

The liquid crystal devices were subjected to the following low-temperature storage test.

Each of the liquid crystal devices was cooled from room temperature to 0° C. or −10° C. at a rate of 1° C./min., left standing for 200 hours at a dark place, and heated to room temperature at a rate of 1° C./min. The liquid crystal devices were subjected to measurement of values of θa and C/R and observation of a change of the C1 uniform alignment state before the cooling and after the heating, respectively, at 25° C.

The results are shown in Tables 4-2 and 4-3 below.

TABLE 4-2

| | | | Storage Test (at 0° C. for 200 hours) | | | | |
|---|---|---|---|---|---|---|---|
| | | | Before storage | | After storage | | (at 25° C.) Change of alignment |
| Example | L.C. | TδS | θa*[1] | C/R | θa*[1] | C/R | state*[2] |
| Ex. 6 | B | −3 | 11.0 | 48:1 | 11.0 | 47:1 | Not observed |
| Comp. Ex. | | | | | | | |
| 10 | C | +2 | 11.8 | 41:1 | 11.4 | 30:1 | I |
| 11 | D | +3 | 11.6 | 58:1 | 11.1 | 34:1 | I |
| 12 | X | +6 | 10.7 | 44:1 | 10.1 | 29.1 | I |

*[1]Hereinbelow, θa was measured at a part free from the C1 splay alignment state (i.e., a part in the C1 uniform alignment state).
*[2]Hereinbelow, I and II mean the following states.
I: C1 splay alignment state appeared.
II: C1 spray alignment state appeared and "streak defect" and "deviation of the darkest axis" were observed.

TABLE 4-3

| | | | Storage Test (at −10° C. for 200 hours) | | | | |
|---|---|---|---|---|---|---|---|
| Comp. | | | Before storage | | After storage | | (at 25° C.) Change of alignment |
| Ex. No. | L.C. | TδS | θa | C/R | θa | C/R | state |
| 13 | B | −3 | 11.0 | 48:1 | 10.8 | 39:1 | I |
| 14 | C | +2 | 11.8 | 41:1 | 11.3 | 28:1 | II |
| 15 | D | +3 | 11.6 | 58:1 | 11.2 | 36:1 | II |
| 16 | X | +6 | 10.7 | 45:1 | 10.2 | 33:1 | II |

As is apparent from the above results, even in the C1 uniform alignment state, the values of θa and C/R were not substantially changed when the storage temperature was higher than TδS.

On the other hand, when the storage temperature was lower than TδS, the values of θa and C/R were lowered and the change of the C1 uniform alignment state was observed. These phenomena which were not observed in C2 splay alignment adversely affected display characteristics as a practical liquid crystal device.

Example 7–14 Comparative Examples 17 and 18

An experiment for comparing low-temperature storage properties was performed.

Liquid crystal devices were prepared and evaluated in the same manner as in Example 6 except that the liquid crystal compositions F to I and X were used and the storage temperatures were changed from 0° C. and −10° C. to −10° C. and −30° C., respectively.

All the liquid crystal devices showed a C1 uniform alignment state in a temperature range of about 10° to 50° C. Further, each of the temperature dependence of δ with respect to the compositions F to I and X was shown in FIG. 7.

The results are shown in Tables 5-1 and 5-2 below.

TABLE 5-1

Storage Test (at −10° C. for 200 hours)

| Example | L.C. | TδS | Before storage θa | Before storage C/R | After storage θa | After storage C/R | (at 25° C.) Change of alignment state |
|---|---|---|---|---|---|---|---|
| Ex. | | | | | | | |
| 7 | F | Not observed | 12.0 | 48:1 | 12.0 | 50:1 | Not observed |
| 8 | G | Not observed | 12.1 | 51:1 | 12.1 | 52:1 | Not observed |
| 9 | H | Not observed | 12.6 | 62:1 | 12.6 | 60:1 | Not observed |
| 10 | I | Not observed | 12.3 | 58:1 | 12.3 | 56:1 | Not observed |
| Comp. Ex. 17 | X | +6 | 10.7 | 45:1 | 10.2 | 31:1 | II |

TABLE 5-2

Storage Test (at −30° C. for 200 hours)

| Example | L.C. | TδS | Before storage θa | Before storage C/R | After storage θa | After storage C/R | (at 25° C.) Change of alignment state |
|---|---|---|---|---|---|---|---|
| Ex. | | | | | | | |
| 11 | F | Not observed | 12.0 | 49:1 | 12.0 | 50:1 | Not observed |
| 12 | G | Not observed | 12.1 | 50:1 | 12.2 | 58:1 | Not observed |
| 13 | H | Not observed | 12.6 | 64:1 | 12.6 | 62:1 | Not observed |
| 14 | I | Not observed | 12.3 | 57:1 | 12.3 | 56:1 | Not observed |
| Comp. Ex. 18 | X | +6 | 10.7 | 45:1 | 10.2 | 31:1 | II |

Figure 7:
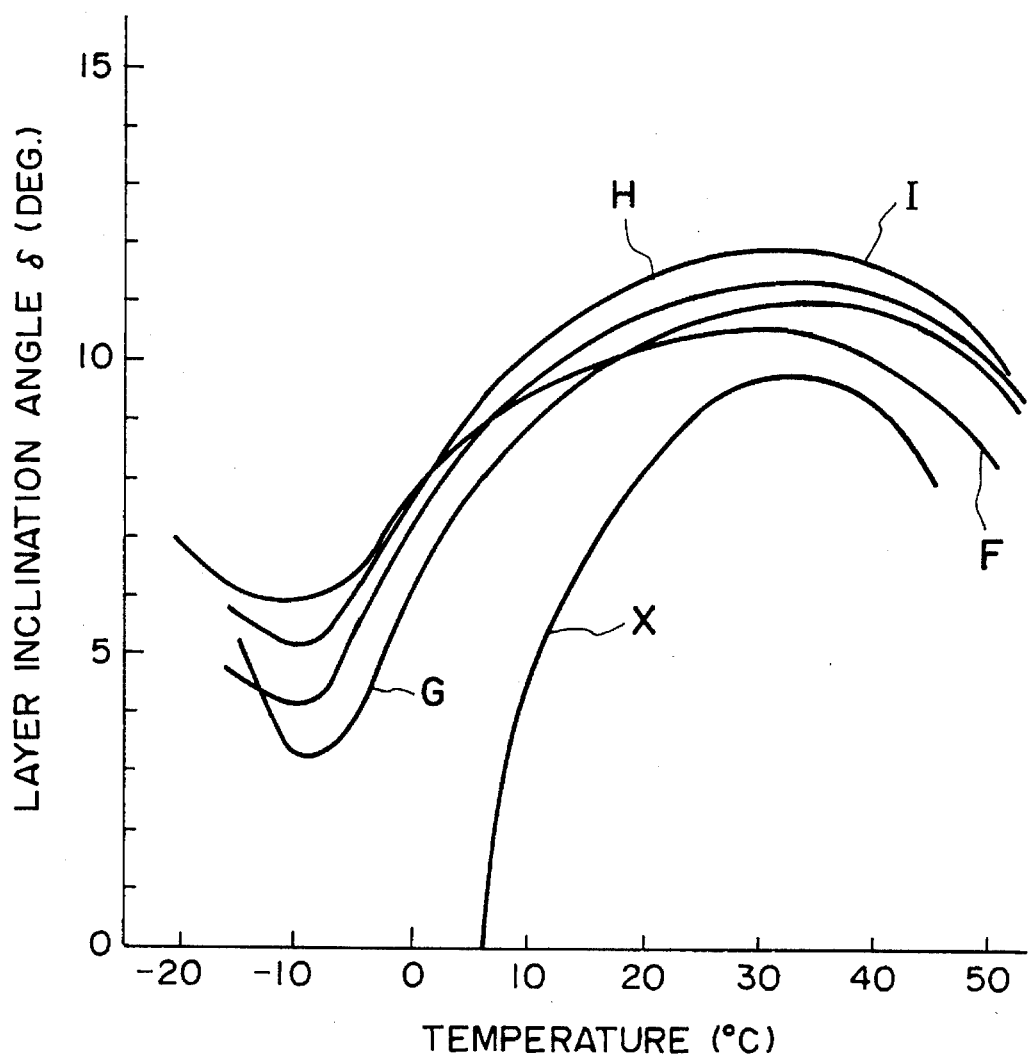

As is understood from the above results and FIG. 7, the liquid crystal compositions F to I having a specific temperature dependence of δ as shown in FIG. 7 provided an improved low-temperature storage properties since the layer structure of the compositions F to I was not changed from chevron structure to bookshelf structure. Further, the composition G provided a slightly larger θa and a higher contrast than those before the storage test at −30° C. but did not adversely affected display characteristics as a practical liquid crystal device. Examples 15–17 and Comparative Examples 19–21

An experiment for comparing low-temperature storage properties was performed by using the above-mentioned device structure for measurement of δ and directing attention to temperature dependence of δ in a liquid crystal device having the device structure.

Blank cells for liquid crystal devices were prepared in the same manner as in Example 1 except that a polyimide resin precursor LQ-1802 was used instead of the polyimide resin precursor LP-64.

Then, each of the liquid crystal compositions J, K and L was injected into the blank cell, subjected to aging treatment for 5 hours at about 100° C., and was gradually cooled to 25° C. to prepare a liquid crystal device.

The thus prepared liquid crystal devices were subjected to measurement of an alignment state and a value of δ. The liquid crystal devices showed a C1 uniform alignment state and had a pretilt angle δ of 19 degrees.

Further, the liquid crystal devices having the device structure for measurement of δ provide the same results as those of liquid crystal devices using a 1.1 mm-thick glass plates in respect of an alignment state, an apparent tilt angle θa and a contrast ratio C/R.

A temperature dependence of δ with respect to each of the liquid crystal devices using the compositions J, K and L was shown in FIG. 8.

A low-temperature storage test was conducted in the following manner by using the above liquid crystal devices.

Each of the liquid crystal devices was cooled to −10° C. and −30° C. at a rate of 1° C./min., left standing for 24 hours, and heated to 25° C. at a rate of 1° C./min. The liquid crystal devices were subject to measurement of values of θa and C/R and observation of a change of the C1 alignment state before the cooling and after the heating, respectively, at 25° C.

The results are shown in Tables 6-1 and 6-2 below.

TABLE 6-1

Storage Test (at −10° C. for 24 hours)

| Example | L.C. | TδS | Before storage θa | Before storage C/R | After storage θa | After storage C/R | (at 25° C.) Change of alignment state |
|---|---|---|---|---|---|---|---|
| Ex. | | | | | | | |
| 15 | J | Not observed | 11.5 | 53:1 | 11.5 | 54:1 | Not observed |
| 16 | L | −12 | 11.3 | 51:1 | 11.3 | 54:1 | Not observed |
| Comp. Ex. 19 | K | −3 | 10.5 | 46:1 | 10.1 | 34:1 | I |

TABLE 6-2

Storage Test (at −30° C. for 24 hours)

| Example | L.C. | TδS | Before storage θa | Before storage C/R | After storage θa | After storage C/R | Change of alignment state |
|---|---|---|---|---|---|---|---|
| Ex. 17 | J | Not observed | 11.5 | 58:1 | 11.5 | 55:1 | Not observed |
| Comp. Ex. | | | | | | | |
| 20 | L | −12 | 11.3 | 54:1 | 11.3 | 37:1 | I |
| 21 | K | −3 | 10.5 | 48:1 | 10.2 | 34:1 | II |

As is apparent from the above results, the values of θa and C/R and the C1 uniform state were not substantially changed when the storage temperature was higher than TδS or TδS was not observed.

On the other hand, when the storage temperature was lower than TδS, the values of θa and C/R and the C1 alignment state were changed, thus resulting in deterioration in display characteristics as a practical liquid crystal device.

As is understood from the above Examples and Comparative Examples, by using a liquid crystal composition characterized by showing a temperature dependence of a layer inclination δ such that the layer inclination angle δ increases on temperature decrease down to a mediate temperature (providing a maximum) and decreases on temperature decrease below the mediate temperature and also characterized by having a value of TδS lower than an ambient temperature at which the resultant liquid crystal device can be used or in storage or not having TδS, it is possible to provide a liquid crystal device (or apparatus) with a decreased temperature dependence and free from deterioration in display characteristics through a low-temperature storage test.

Alternatively, in order to provide such a liquid crystal device (or apparatus), it is understood that the liquid crystal device is designed so as to satisfy a temperature dependence of δ such that δ increases on temperature decrease down to a mediate temperature (providing a maximum) and decreases on temperature decrease below the mediate temperature and then starts to increase again on further temperature decrease before it reaches zero degrees.

As described hereinabove, according to the present invention, there is provided a liquid crystal composition, a liquid crystal device and a liquid crystal apparatus using the composition and the device, which device or apparatus can improve a temperature dependence of response speed and can effect a display excellent in display characteristics free from a deterioration thereof through a low-temperature storage test.

What is claimed is:

1. A liquid crystal composition comprising a chiral smectic liquid crystal and showing a layer inclination angle δ in smectic phase, wherein the layer inclination angle δ has a temperature dependence such that the layer inclination angle δ increases on temperature decrease down to a mediate temperature and decreases on temperature decrease below the mediate temperature and then starts to increase again on further temperature decrease before it reaches zero degrees.

2. A liquid crystal composition according to claim 1, wherein the layer inclination angle δ has the temperature dependence in an ambient temperature range.

3. A liquid crystal composition according to any one of claims 1 or 2, wherein the layer inclination angle δ shows a maximum of at most 20 degrees.

4. A liquid crystal composition according to any one of claims 1 or 2, wherein the layer inclination angle δ shows a maximum of at most 15 degrees.

5. A liquid crystal composition according to any one of claims 1 or 2, comprising at least one species of an indan-type compound represented by the following formula (I):

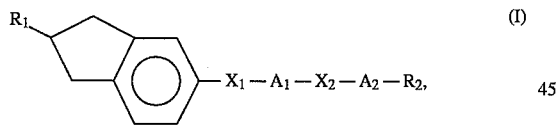

wherein $R_1$ and $R_2$ independently denote hydrogen,

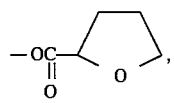

halogen, or a linear or branched alkyl group having 1–18 carbon atoms capable of including one or non-neighboring two or more —$CH_2$— groups which can be replaced with —O—, —S—,

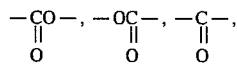

—CH=CH— or —C≡C—, the linear or branched alkyl group being capable of including hydrogen which can be replaced with fluorine;

$X_1$ and $X_2$ independently denoted a single bond,

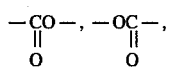

—$CH_2O$— or —$OCH_2$—;

$A_1$ denotes

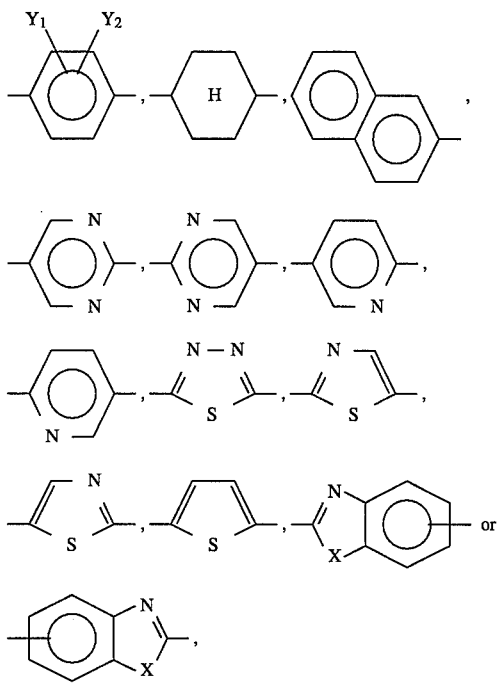

wherein $Y_1$ and $Y_2$ independently denote H, F, Cl, Br, —$CH_3$, —$CF_3$ or —CN; and X denotes O or S;

$A_2$ denotes a single bond or $A_1$; and with the proviso that $A_1$ is not

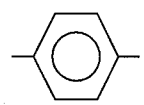

when $X_1$ is —COO— and $A_2$ is a single bond.

6. A liquid crystal composition according to claim 5, which contains 5–80 wt. % of an indan-type compound of the formula (I).

7. A liquid crystal composition according to claim 5, which contains comprises 10–80 wt. % of an indan-type compound of the formula (I).

8. A liquid crystal composition according to claim 6, which further comprises at least one species of a pyrimidine-type compound represented by the following formula (II):

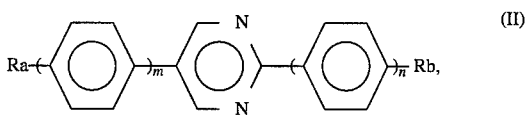

wherein Ra and Rb independently denote a linear or branched alkyl group having 1–20 carbon atoms capable of including one or non-neighboring two —$CH_2$— groups which can be replaced with —O—,

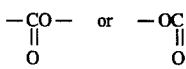

and the —CH$_2$— groups capable of including hydrogen which can be replaced with Cl, F or —CF$_3$; and m and n are 0, 1 or 2 with the proviso that m+n=1 or 2.

9. A liquid crystal composition according to claim 8, which contains 5–80 wt. % of an indan-type compound of the formula (I) and 5–80 wt. % of a pyrimidine-type compound of the formula (II).

10. A liquid crystal composition according to claim 8, which contains 10–80 wt. % of an indan-type compound of the formula (I) and 10–80 wt. % of a pyrimidine-type compound of the formula (II).

11. A liquid crystal device, comprising: a pair of substrates and a chiral smectic liquid crystal disposed between the substrates, each of the substrates having thereon an electrode for applying an electric field to the liquid crystal composition:

wherein the liquid crystal shows a layer inclination angle δ in smectic phase, the layer inclination angle δ having a temperature dependence such that the layer inclination angle δ increases on temperature decrease down to a mediate temperature and decreases on temperature decrease below the mediate temperature and then starts to increase again on further temperature decrease before it reaches zero degrees.

12. A liquid crystal composition according to claim 11, wherein the layer inclination angle δ has the temperature dependence in an ambient temperature range.

13. A liquid crystal device according to any one of claims 11 or 12, wherein the layer inclination angle δ shows a maximum of at most 20 degrees.

14. A liquid crystal device according to any one of claims 11 to 12, wherein the layer inclination angle δ shows a maximum of at most 15 degrees.

15. A liquid crystal device according to any one of claims 11 to 12, wherein the liquid crystal comprises at least one species of an indan-type compound represented by the following formula (I):

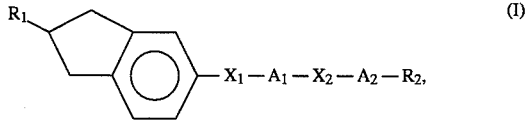

wherein

R$_1$ and R$_2$ independently denote hydrogen,

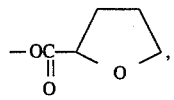

halogen, or a linear or branched alkyl group having 1–18 carbon atoms capable of including one or non-neighboring two or more —CH$_2$—groups which can be replaced with —O—, —S—,

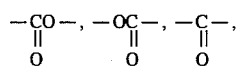

—CH=C— or —C≡C—, the linear or branched alkyl group being capable of including hydrogen which can be replaced with fluorine;

X$_1$ and X$_2$ independently denote a single bond,

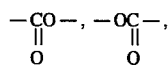

—CH$_2$O— or —OCH$_2$—;

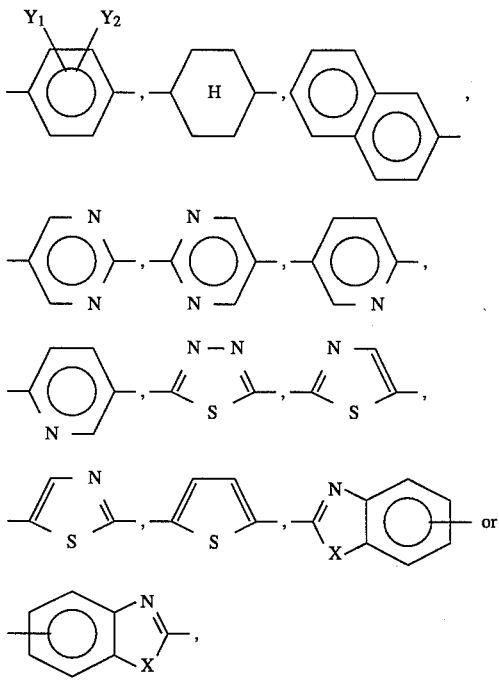

wherein Y$_1$ and Y$_2$ independently denote H, F, Cl, Br, —CH$_3$, —CF$_3$ or —CN; and X denotes O or S;

A$_2$ denotes a single bond or A$_1$; and with the proviso that A$_1$ is not

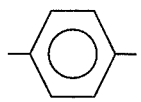

when X$_1$ is —COO— and A$_2$ is a single bond.

16. A liquid crystal device according to claim 15, wherein the liquid crystal contains 5–80 wt. % of an indan-type compound of the formula (I).

17. A liquid crystal device according to claim 15, wherein the liquid crystal contains 10–80 wt. % of an indan-type compound of the formula (I).

18. A liquid crystal device according to claim 15, wherein the liquid crystal further comprises at least one species of a pyrimidine-type compound represented by the following formula (II):

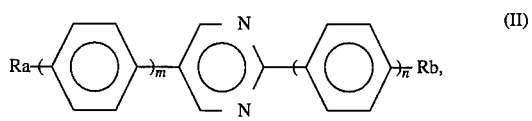

wherein Ra and Rb independently denote a linear or branched alkyl group having 1–20 carbon atoms capable of including one or non-neighboring two —CH$_2$— groups which can be replaced with —O—, $$-\underset{\underset{O}{\|}}{C}O- \quad \text{or} \quad -O\underset{\underset{O}{\|}}{C}$$

and the —$CH_2$— groups capable of including hydrogen which can be replaced with Cl, F or —$CF_3$; and m and n are 0, 1 or 2 with the proviso that m+n=1 or 2.

19. A liquid crystal device according to claim 18, wherein the liquid crystal contains 5–80 wt. % of an indan-type compound of the formula (I) and 5–80 wt. % of a pyrimidine-type compound of the formula (II).

20. A liquid crystal device according to claim 18, wherein the liquid crystal contains 10–80 wt. % of an indan-type compound of the formula (I) and 10–80 wt. % of a pyrimidine-type compound of the formula (II).

21. A liquid crystal device, comprising: a pair of substrates and a liquid crystal comprising a chiral smectic liquid crystal disposed between the substrates, each of the substrates having thereon an electrode for applying an electric field to the liquid crystal, the substrates having been subjected to alignment treatment giving uniaxial alignment axes intersecting each other at a prescribed angle so as to align the liquid crystal;

wherein the liquid crystal is placed in such an alignment state that the liquid crystal shows a pretilt angle α, a cone angle Ⓗ, a layer inclination angle δ in smectic phase satisfying relationships of: Ⓗ<α+δ and α<δ;

the liquid crystal is further placed in such an alignment state that the liquid crystal molecules are oriented to at least two optically stable states which form an angle 2θa therebetween (θa; apparent tilt angle), the apparent tilt angle θa and the cone angle Ⓗ satisfying a relationship of: Ⓗ>θa> Ⓗ/2; and the layer inclination angle δ has a temperature dependence such that the layer inclination angle δ increases on temperature decrease down to a mediate temperature and decreases on temperature decrease below the mediate temperature and then starts to increase again on further temperature decrease before it reaches zero degrees.

22. A liquid crystal composition according to claim 21, wherein the layer inclination angle δ has the temperature dependence in an ambient temperature range.

23. A liquid crystal device according to any one of claims 21 or 22, wherein the layer inclination angle δ shows a maximum of at most 20 degrees.

24. A liquid crystal device according to any one of claims 21 or 22, wherein the layer inclination angle δ shows a maximum of at most 15 degrees.

25. A liquid crystal device according to any one of claims 21 or 22, wherein the liquid crystal comprises at least one species of an indan-type compound represented by the following formula (I):

$$R_1 \text{—indan—} X_1-A_1-X_2-A_2-R_2, \quad (I)$$

wherein $R_1$ and $R_2$ independently denote hydrogen, $$-O\underset{\underset{O}{\|}}{C}\text{—tetrahydrofuran},$$

halogen, or a linear or branched alkyl group having 1–18 carbon atoms capable of including one or non-neighboring two or more —$CH_2$— groups which can be replaced with —O—, —S—, $$-\underset{\underset{O}{\|}}{C}O-, \quad -O\underset{\underset{O}{\|}}{C}-, \quad -\underset{\underset{O}{\|}}{C}-,$$

—CH=CH— or —C≡C—, the linear or branched alkyl group being capable of including hydrogen which can be replaced with fluorine;

$X_1$ and $X_2$ independently denote a single bond, —O—

$$-\underset{\underset{O}{\|}}{C}O-, \quad -O\underset{\underset{O}{\|}}{C}-,$$

—$CH_2$O— or —O$CH_2$—;

$A_1$ denotes

[chemical ring structures with $Y_1$, $Y_2$ substituents; various heterocyclic rings containing N, S, and X]

wherein $Y_1$ and $Y_2$ independently denote H, F, Cl, Br, —$CH_3$, —$CF_3$ or —CN; and X denotes O or S;

$A_2$ denotes a single bond or $A_1$; and with the proviso that $A_1$ is not

[phenyl ring structure]

when $X_1$ is —COO— and $A_2$ is a single bond.

26. A liquid crystal device according to claim 25, wherein the liquid crystal contains 5–80 wt. % of an indan-type compound of the formula (I).

27. A liquid crystal device according to claim 25, wherein the liquid crystal contains 10–80 wt. % of an indan-type compound of the formula (I).

28. A liquid crystal device according to claim 25, wherein the liquid crystal further comprises at least one species of a pyrimidine-type compound represented by the following formula (II):

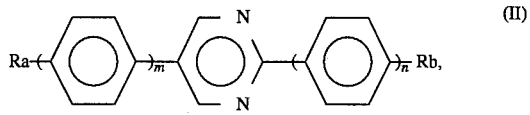

wherein Ra and Rb independently denote a linear or branched alkyl group having 1–20 carbon atoms capable of including one or non-neighboring two —$CH_2$— groups which can be replaced with —O—,

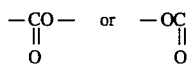

and the —$CH_2$— groups capable of including hydrogen which can be replaced with Cl, F or —$CF_3$; and m and n are 0, 1 or 2 with the proviso that m+n=1 or 2.

29. A liquid crystal device according to claim 28, wherein the liquid crystal contains 5–80 wt. % of an indan-type compound of the formula (I) and 5–80 wt. % of a pyrimidine-type compound of the formula (II).

30. A liquid crystal device according to claim 28, wherein the liquid crystal contains 10–80 wt. % of an indan-type compound of the formula (I) and 10–80 wt. % of a pyrimidine-type compound of the formula (II).

31. A liquid crystal apparatus, including:
at least any one of liquid crystal devices according to claims 11 or 12, a driving circuit for the liquid crystal device, and a light source.

32. A liquid crystal apparatus, including:
at least a liquid crystal device according to claim 13, a driving circuit for the liquid crystal device, and a light source.

33. A liquid crystal apparatus, including:
at least a liquid crystal device according to claim 14, a driving circuit for the liquid crystal device, and a light source.

34. A liquid crystal apparatus, including:
at least a liquid crystal device according to claim 15, a driving circuit for the liquid crystal device, and a light source.

35. A liquid crystal apparatus, including:
at least a liquid crystal device according to claim 16, a driving circuit for the liquid crystal device, and a light source.

36. A liquid crystal apparatus, including:
at least a liquid crystal device according to claim 17, a driving circuit for the liquid crystal device, and a light source.

37. A liquid crystal apparatus, including:
at least a liquid crystal device according to claim 18, a driving circuit for the liquid crystal device, and a light source.

38. A liquid crystal apparatus, including:
at least a liquid crystal device according to claim 19, a driving circuit for the liquid crystal device, and a light source.

39. A liquid crystal apparatus, including:
at least a liquid crystal device according to claim 20, a driving circuit for the liquid crystal device, and a light source.

40. A liquid crystal apparatus, including:
at least any one of liquid crystal devices according to claims 21 to 22, a driving circuit for the liquid crystal device, and a light source.

41. A liquid crystal apparatus, including:
at least a liquid crystal device according to claim 23, a driving circuit for the liquid crystal device, and a light source.

42. A liquid crystal apparatus, including:
at least a liquid crystal device according to claim 24, a driving circuit for the liquid crystal device, and a light source.

43. A liquid crystal apparatus, including:
at least a liquid crystal device according to claim 25, a driving circuit for the liquid crystal device, and a light source.

44. A liquid crystal apparatus, including:
at least a liquid crystal device according to claim 26, a driving circuit for the liquid crystal device, and a light source.

45. A liquid crystal apparatus, including:
at least a liquid crystal device according to claim 27, a driving circuit for the liquid crystal device, and a light source.

46. A liquid crystal apparatus, including:
at least a liquid crystal device according to claim 28, a driving circuit for the liquid crystal device, and a light source.

47. A liquid crystal apparatus, including:
at least a liquid crystal device according to claim 29, a driving circuit for the liquid crystal device, and a light source.

48. A liquid crystal apparatus, including:
at least a liquid crystal device according to claim 30, a driving circuit for the liquid crystal device, and a light source.

* * * * *

UNITED STATES PATENT AND TRADEMARK OFFICE
CERTIFICATE OF CORRECTION

PATENT NO. : 5,458,804

DATED : October 17, 1995

INVENTOR(S) : SYUJI YAMADA ET AL.

It is certified that error appears in the above-identified patent and that said Letters Patent is hereby corrected as shown below:

COLUMN 1

Line 22, "Pat. No. 4367924," should read
         --Pat. No. 4,367,924,--.
    Line 33, "electric" should read --electric field--.

COLUMN 2

Line 12, "a a" should read --a--.
    Line 36, "angle a" should read --angle $\alpha$--.

COLUMN 3

Line 8,  "$(H)+\delta>\alpha$in" should read --$(H)+\delta>\alpha$ in--.
    Line 10, "$(H)-\delta>\alpha$in" should read --$(H)-\delta>\alpha$ in--.
    Line 14, "$(H)<\alpha+\delta+tm(i)$." should read
         --$(H)<\alpha+\delta+tm$    (i).--.
    Line 29, "$(H)>\eta a>(H)/2$.(iii)" should read
         --$(H)>\theta a>(H)/2$.   (iii)--.

UNITED STATES PATENT AND TRADEMARK OFFICE
CERTIFICATE OF CORRECTION

PATENT NO. : 5,458,804

DATED : October 17, 1995

INVENTOR(S): SYUJI YAMADA ET AL.

It is certified that error appears in the above-identified patent and that said Letters Patent is hereby corrected as shown below:

COLUMN 4

Line 43, "that" should be deleted.
    Line 50, "tend" should read --tends--.
    Line 54, "monotonous" should read --monotonic--.

COLUMN 5

Line 3, "ferroeleric-" should read --ferroelectric--.
    Line 7, "decrease" (first occurrence) should read --decreases--.
    Line 42, "angle S," should read --angle $\delta$,-- and "angle a," should read --angle $\alpha$,--.
    Line 43, "angle" (second occurrence) should read --angle $\theta a$--.
    Line 44, "Ⓗ<$\theta a$Ⓗ/Z;" should read --Ⓗ>$\theta a$>Ⓗ/Z;--.

UNITED STATES PATENT AND TRADEMARK OFFICE
CERTIFICATE OF CORRECTION

PATENT NO. : 5,458,804

DATED : October 17, 1995

INVENTOR(S) : SYUJI YAMADA ET AL.

Page 3 of 9

It is certified that error appears in the above-identified patent and that said Letters Patent is hereby corrected as shown below:

COLUMN 7

Line 45, "Ⓗ$>\alpha+\delta$" should read --Ⓗ$<\alpha+\delta$-- and "$\alpha<\delta;$" should read --$\alpha>\delta;$--.

Line 52, "Ⓗ$>\theta a\theta$ Ⓗ$/2;$" should read --Ⓗ$>\theta a>$Ⓗ$/2;$--.

COLUMN 8

Line 16, "Are" should read --are--.

COLUMN 9

Line 13, "bond," should read --bond, -O- --.

COLUMN 11

Line 25, "compound" should read --compounds--.
  Line 41, "-CH$_2$-" should read --and the -CH$_2$- --.

UNITED STATES PATENT AND TRADEMARK OFFICE
CERTIFICATE OF CORRECTION

PATENT NO. : 5,458,804

DATED : October 17, 1995

INVENTOR(S): SYUJI YAMADA ET AL.

Page 4 of 9

It is certified that error appears in the above-identified patent and that said Letters Patent is hereby corrected as shown below:

COLUMN 12

Line 55, "&N-N" should read --N-N--.

COLUMN 13

Line 37, "-COO-0" should read -- -COO- --.

COLUMN 14

Line 9, "independency" should read --independently--.
Line 21, "non-neiboring" should read --non-neighboring--.
Line 60, "F" should read --$R_7$--.
Line 65, "Wherein" should read -- 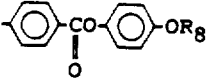 Wherein--.

UNITED STATES PATENT AND TRADEMARK OFFICE
CERTIFICATE OF CORRECTION

PATENT NO. : 5,458,804

DATED : October 17, 1995

INVENTOR(S): SYUJI YAMADA ET AL.

It is certified that error appears in the above-identified patent and that said Letters Patent is hereby corrected as shown below:

COLUMN 15

Line 4, "above-mentioend" should read
        --above-mentioned---.

COLUMN 16

Line 5, "thereof" should read --thereon--.
    Line 52, "$\theta$a layer" should read --$\theta$a, layer--.

COLUMN 17

Line 3, "polarizes" should read --polarizers--.
    Line 51, "when alignment" should read --Alignment--
        and "provided" should read --provide--.
    Line 66, "80 $\mu$um-thick" should read --80 $\mu$m-thick--.

COLUMN 18

Line 8, "ration" should read --ratio--.
    Line 58, ")]," should read --)],
                             and --.

UNITED STATES PATENT AND TRADEMARK OFFICE
CERTIFICATE OF CORRECTION

PATENT NO. : 5,458,804

DATED : October 17, 1995

INVENTOR(S): SYUJI YAMADA ET AL.

It is certified that error appears in the above-identified patent and that said Letters Patent is hereby corrected as shown below:

COLUMN 19

Line 9, "mula (III)-(V)," should read --mulae (III)-(V),--.

COLUMN 23

Line 20, "the of" should read --the compositions A to L and X had a temperature dependence of--.
    Line 63, "monotonously" should read --monotonically--.

COLUMN 25

Line 11, "subjected" should read --subjected to--.
    Line 58, "monotonously" should read --monotonically--.

COLUMN 26

Line 28, "result" should read --results--.
    Line 36, "$T\delta s*^1$" should read --$T\delta S*^1$--.
    Line 58, "$T\delta s$" should read --$T\delta S$--.

UNITED STATES PATENT AND TRADEMARK OFFICE
CERTIFICATE OF CORRECTION

PATENT NO. : 5,458,804

DATED : October 17, 1995

INVENTOR(S) : SYUJI YAMADA ET AL.

It is certified that error appears in the above-identified patent and that said Letters Patent is hereby corrected as shown below:

<u>COLUMN 27</u>

Line 7, "T$\delta$s" should read --T$\delta$S--.
    Line 43, "composition A" should read
        --compositions A--.

<u>COLUMN 28</u>

Line 23, "spray" should read --splay--.
    Line 52, "Example 7-14" should read
        --Examples 7-14 and--.

<u>COLUMN 29</u>

Line 47, "Examples 15-17" should read
        --¶ Examples 15-17--.
    Line 64, "$\delta$." should read --$\alpha$.--.

UNITED STATES PATENT AND TRADEMARK OFFICE
CERTIFICATE OF CORRECTION

PATENT NO. : 5,458,804

DATED : October 17, 1995

INVENTOR(S): SYUJI YAMADA ET AL.

It is certified that error appears in the above-identified patent and that said Letters Patent is hereby corrected as shown below:

COLUMN 30

Line 13, "subject" should read --subjected--.
    Line 61, "inclination $\delta$" should read --inclination angle $\delta$--.

COLUMN 31

Line 67, "bond," should read --bond, -O-,--.

COLUMN 32

Line 52, "comprises" should be deleted.
    Line 54, "claim 6," should read --claim 5,--.

COLUMN 33

Line 37, "to" should read --or--.
    Line 40, "to" should read --or--.

UNITED STATES PATENT AND TRADEMARK OFFICE
CERTIFICATE OF CORRECTION

PATENT NO.   : 5,458,804

DATED        : October 17, 1995

INVENTOR(S)  : SYUJI YAMADA ET AL.

It is certified that error appears in the above-identified patent and that said Letters Patent is hereby corrected as shown below:

COLUMN 34

Line 1, "bond," should read --bond, -O- --.
   Line 10, "-OCH$_2$-;" should read
           -- -OCH$_2$-; A   denotes--.

COLUMN 35

Line 30, "$\alpha<\delta$;" should read --$\alpha>\delta$;--.
   Line 46, "composition" should read --device--.

Signed and Sealed this

Nineteenth Day of November, 1996

BRUCE LEHMAN

Attesting Officer     Commissioner of Patents and Trademarks